(12) United States Patent
Yoshikawa et al.

(10) Patent No.: US 12,104,670 B2
(45) Date of Patent: Oct. 1, 2024

(54) VIBRATION-DAMPING DEVICE

(71) Applicant: Prospira Corporation, Kawasaki (JP)

(72) Inventors: Mao Yoshikawa, Tokyo (JP); Masaki Hosoda, Tokyo (JP); Takeshi Furukori, Tokyo (JP)

(73) Assignee: Prospira Corporation, Kawasaki (JP)

( * ) Notice: Subject to any disclaimer, the term of this patent is extended or adjusted under 35 U.S.C. 154(b) by 351 days.

(21) Appl. No.: 17/775,627

(22) PCT Filed: Nov. 10, 2020

(86) PCT No.: PCT/JP2020/041904
§ 371 (c)(1),
(2) Date: May 10, 2022

(87) PCT Pub. No.: WO2021/095724
PCT Pub. Date: May 20, 2021

(65) Prior Publication Data
US 2022/0397178 A1 Dec. 15, 2022

(30) Foreign Application Priority Data
Nov. 13, 2019 (JP) .................................. 2019-205441
Nov. 13, 2019 (JP) .................................. 2019-205446

(51) Int. Cl.
F16F 13/16 (2006.01)
F16F 13/14 (2006.01)
B60K 5/12 (2006.01)

(52) U.S. Cl.
CPC .......... F16F 13/16 (2013.01); F16F 13/1445 (2013.01); B60K 5/1208 (2013.01); F16F 2226/04 (2013.01); F16F 2232/08 (2013.01)

(58) Field of Classification Search
CPC ...... F16F 13/16; F16F 13/1445; F16F 13/103; F16F 13/105; F16F 13/108; F16F 2226/04; F16F 2232/08
See application file for complete search history.

(56) References Cited

U.S. PATENT DOCUMENTS 5,690,320 A * 11/1997 Kanda .................... F16F 13/16
267/140.5
5,895,032 A * 4/1999 Simuttis ................ F16F 13/108
267/219

(Continued)

FOREIGN PATENT DOCUMENTS

JP 2011-220486 A 11/2011
JP 2016-65558 A 4/2016

(Continued)

OTHER PUBLICATIONS

May 17, 2022, International Preliminary Report on Patentability issued in the International Patent Application No. PCT/JP2020/041904.

(Continued)

Primary Examiner — Bradley T King
(74) Attorney, Agent, or Firm — KENJA IP LAW PC

(57) ABSTRACT

An outer attachment member (111) includes a first end member (117), a second end member (118), and an intermediate member (116), in which the first end member (117) and the second end member (118) are respectively fitted into both end portions of the intermediate member (116) in the axial direction, a coupled portion (135) provided in any one of the vibration generating part and the vibration receiving part is disposed on one end surface of both end surfaces of the first mounting projecting portion (124) in the axial direction provided in the intermediate member (116), and a second mounting projecting portion (125) is disposed on the other end surface thereof, the first mounting projecting (Continued)

portion (124) and the second mounting projecting portion (125) are separately provided with insertion holes (111a) through which fixing bolts (136) for integrally fixing the first mounting projecting portion (124) and the second mounting projecting portion (125) are inserted, a first crimping portion (128) and a second crimping portion (129) for separately crimping the first end member (117) and the second end member (118) is formed at both end portions of the intermediate member (116) in the axial direction, and the circumferential length of the first crimping portion (128) is larger than the circumferential length of the second crimping portion (129).

16 Claims, 6 Drawing Sheets

(56) References Cited

U.S. PATENT DOCUMENTS

| | | | | |
|---|---|---|---|---|
| 2005/0230889 A1* | 10/2005 | Minamisawa | ...... | F16F 13/1409 267/141.2 |
| 2006/0261531 A1* | 11/2006 | Kim | ........ | F16F 13/16 267/140.13 |
| 2008/0018031 A1* | 1/2008 | Goudie | ........ | F16F 13/105 267/140.11 |
| 2010/0213650 A1* | 8/2010 | Katayama | ....... | F16F 13/107 267/118 |
| 2013/0038006 A1 | 2/2013 | Saito et al. | | |
| 2015/0240905 A1* | 8/2015 | Kuzukawa | ....... | F16F 13/108 267/140.13 |
| 2016/0053845 A1* | 2/2016 | Ueki | ........ | B60K 5/1208 267/140.13 |
| 2018/0058535 A1* | 3/2018 | Snyder | ....... | F16F 15/022 |
| 2018/0066726 A1* | 3/2018 | Parr | ....... | F16F 13/10 |
| 2018/0106324 A1* | 4/2018 | Takakura | ....... | B60K 5/1208 |
| 2019/0389296 A1* | 12/2019 | Kojima | ....... | F16F 13/16 |
| 2020/0080615 A1* | 3/2020 | Zehnder, II | ....... | F16F 13/106 |
| 2020/0248777 A1* | 8/2020 | Rawlings | ....... | F16F 13/105 |
| 2020/0325955 A1* | 10/2020 | Kim | ....... | B60K 5/1283 |
| 2020/0325957 A1* | 10/2020 | Werner | ....... | F16F 13/1481 |
| 2021/0317895 A1* | 10/2021 | Molesworth | ....... | F16F 13/107 |
| 2022/0397178 A1* | 12/2022 | Yoshikawa | ....... | F16F 13/1409 |
| 2023/0358293 A1* | 11/2023 | Kojima | ....... | F16F 13/107 |
| 2024/0034142 A1* | 2/2024 | Cho | ....... | F16F 1/3873 |

FOREIGN PATENT DOCUMENTS

| | | |
|---|---|---|
| JP | 2019-196811 A | 11/2019 |
| JP | 2019-196820 A | 11/2019 |
| WO | 2018/180259 A1 | 10/2018 |
| WO | WO-2019216048 A1 * | 11/2019 |

OTHER PUBLICATIONS

International Search Report for PCT/JP2020/041904 dated, Jan. 12, 2021 (PCT/ISA/210).

* cited by examiner

VIBRATION-DAMPING DEVICE

CROSS REFERENCE TO RELATED APPLICATIONS

This application is a National Stage of International Application No. PCT/JP2020/041904 filed on Nov. 10, 2020, claiming priority based on Japanese Patent Application. No. 2019-205441 filed on Nov. 13, 2019, and Japanese Patent Application. No. 2019-205446 filed on Nov. 13, 2019.

TECHNICAL FIELD

The present invention relates to a vibration-damping device that is applied to, for example, automobiles, industrial machines, or the like, and absorbs and damps vibrations of vibration generating parts, such as engines.

Priority is claimed on Japanese Patent Application No. 2019-205441, filed Nov. 13, 2019 and Japanese Patent Application No. 2019-205446, filed Nov. 13, 2019, the contents of which are incorporated herein by reference.

BACKGROUND ART

In the related art, there has been known a vibration-damping device including a tubular outer attachment member coupled to any one of a vibration generating part and a vibration receiving part, and an inner attachment member coupled to the other of the vibration generating part and the vibration receiving part and disposed inside the outer attachment member, a pair of first main body rubbers that couples the outer attachment member and the inner attachment member to each other and is disposed at a distance in an axial direction along a central axis of the outer attachment member, and a partition member that partitions a liquid chamber between the pair of first main body rubbers into a first liquid chamber and a second liquid chamber in the axial direction and is provided with a restriction passage allowing the first liquid chamber and the second liquid chamber to communicate with each other. In this vibration-damping device, when axial vibration is input, the vibration can be damped and absorbed by causing a liquid in the liquid chamber to flow between the first liquid chamber and the second liquid chamber through the restriction passage.

As this type of vibration-damping device, there has been known a configuration, for example, as shown in the following Patent Document 1, in which the outer attachment member includes a first end member and a second end member to which a pair of first main body rubbers respectively coupled, and an intermediate member to which a partition member is coupled, and the first end member is sandwiched and fixed in the axial direction by a coupled portion provided in any one of the vibration generating part and the vibration receiving part and a first mounting projecting portion provided on the intermediate member.

CITATION LIST

Patent Document

Patent Document 1

Japanese Unexamined Patent Application, First Publication No. 2011-220486

SUMMARY OF INVENTION

Technical Problem

In the related-art vibration-damping device, when vibration is input, there is a possibility that the first end member collides against the coupled portion and the first mounting projecting portion to generate an abnormal noise.

The present invention has been made in view of the above-mentioned circumstances, and an object of the present invention is to provide a vibration-damping device capable of suppressing the generation of abnormal noise when vibration is input.

Solution to Problem

A vibration-damping device according to a first aspect of the present invention includes a tubular outer attachment member coupled to any one of a vibration generating part and a vibration receiving part, and an inner attachment member coupled to the other of the vibration generating part and the vibration receiving part and disposed inside the outer attachment member, a pair of first main body rubbers that couples the outer attachment member and the inner attachment member to each other and is disposed at a distance in an axial direction along a central axis of the outer attachment member, and a partition member that partitions a liquid chamber between the pair of first main body rubbers into a first liquid chamber and a second liquid chamber in the axial direction and is provided with a restriction passage allowing the first liquid chamber and the second liquid chamber to communicate with each other, in which the outer attachment member includes a first end member and a second end member to which the pair of first main body rubbers is respectively coupled, and an intermediate member to which the partition member is coupled, the intermediate member is formed in a tubular shape extending in the axial direction, the first end member and the second end member are respectively fitted into both end portions of the intermediate member in the axial direction, a first mounting projecting portion is provided on an outer circumferential surface of the intermediate member to project radially outward, a second mounting projecting portion is provided on the second end member to project radially outward, a coupled portion provided in any one of the vibration generating part and the vibration receiving part is disposed on any one end surface of both end surfaces of the first mounting projecting portion in the axial direction, and the second mounting projecting portion is disposed on the other end surface thereof, the first mounting projecting portion and the second mounting projecting portion are separately provided with insertion holes through which fixing bolts for integrally fixing the first mounting projecting portion and the second mounting projecting portion and for coupling the first mounting projecting portion to the coupled portion are inserted, a first crimping portion for crimping the first end member and a second crimping portion for crimping the second end member are separately formed at both end portions of the intermediate member in the axial direction, and a circumferential length of the first crimping portion is larger than a circumferential length of the second crimping portion.

A vibration-damping device according to a second aspect of the present invention includes a tubular outer attachment member coupled to any one of a vibration generating part and a vibration receiving part, and an inner attachment member coupled to the other of the vibration generating part and the vibration receiving part and disposed inside the outer attachment member, a pair of first main body rubbers that couples the outer attachment member and the inner attachment member to each other and is disposed at a distance in an axial direction along a central axis of the outer attachment member, and a partition member that partitions a liquid chamber between the pair of first main body rubbers into a first liquid chamber and a second liquid chamber in the axial direction and is provided with a restriction passage allowing the first liquid chamber and the second liquid chamber to communicate with each other, in which the outer attachment member includes a first end member and a second end member to which the pair of first main body rubbers is respectively coupled, and an intermediate member to which the partition member is coupled, the intermediate member is formed in a tubular shape extending in the axial direction, the first end member and the second end member are respectively fitted into both end portions of the intermediate member in the axial direction, a first mounting projecting portion is provided on an outer circumferential surface of the intermediate member to project radially outward, a second mounting projecting portion is provided on the second end member to project radially outward, a coupled portion provided in any one of the vibration generating part and the vibration receiving part is disposed on any one end surface of both end surfaces of the first mounting projecting portion in the axial direction, and the second mounting projecting portion is disposed on the other end surface thereof, the first mounting projecting portion and the second mounting projecting portion are separately provided with insertion holes through which fixing bolts for integrally fixing the first mounting projecting portion and the second mounting projecting portion and for coupling the first mounting projecting portion to the coupled portion are inserted, and first crimping portions for crimping the first end member are separately formed at intervals in the circumferential direction on the intermediate member and the first mounting projecting portion.

Advantageous Effects of Invention

According to the present invention, it is possible to suppress the generation of abnormal noise when vibration is input.

DESCRIPTION OF EMBODIMENTS

Hereinafter, a vibration-damping device 11 according to a first embodiment of the present invention will be described with reference to the drawings.

Figure 1:
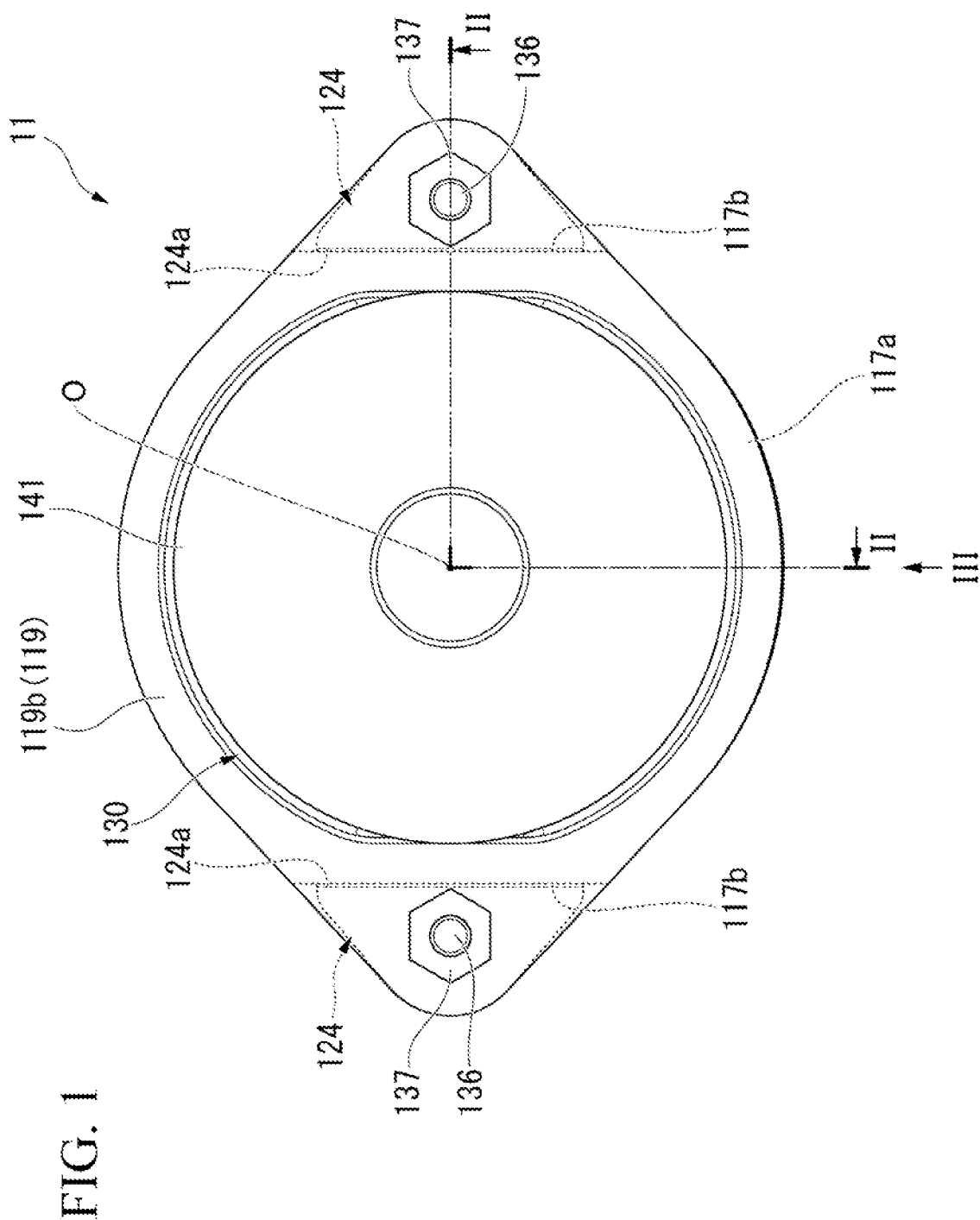
FIG. 1 is a top view of a vibration-damping device according to an embodiment of the present invention.
Figure 2:
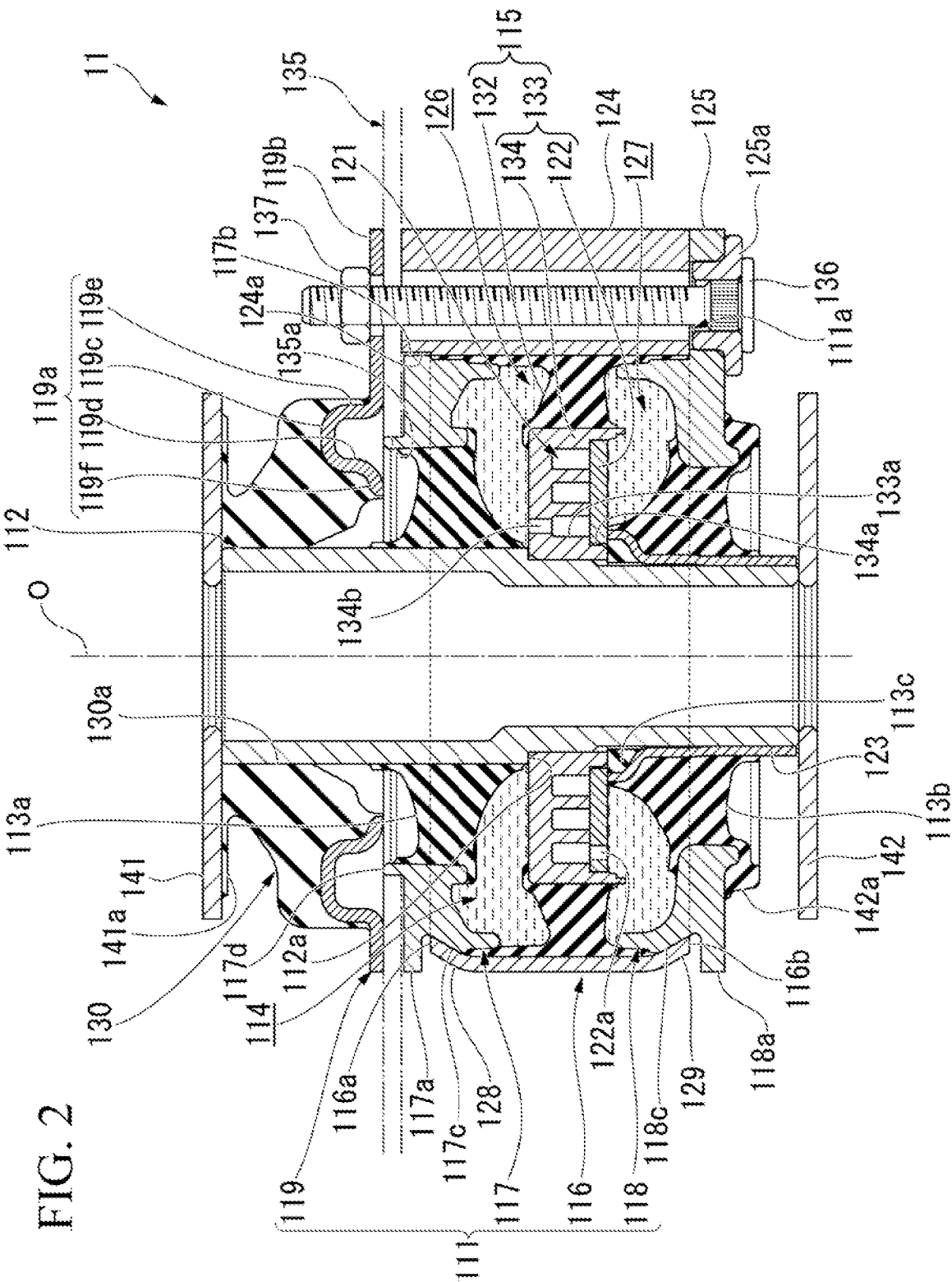
FIG. 2 is a cross-sectional view taken along line II-II of FIG. 1.

As shown in FIGS. 1 and 2, the vibration-damping device 11 includes a tubular outer attachment member 111 coupled to any one of a vibration generating part and a vibration receiving part, and an inner attachment member 112 coupled to the other thereof and disposed inside the outer attachment member 111, a pair of first main body rubbers 113a and 113b that couples the outer attachment member 111 and the inner attachment member 112 to each other and disposed at a distance in an axial direction along a central axis O of the outer attachment member 111, a partition member 115 that partitions the liquid chamber 114 between the pair of first main body rubbers 113a and 113b in the axial direction, and a second main body rubber 130 that couples the outer attachment member 111 and the inner attachment member 112 to each other and is disposed axially outside the liquid chamber 114.

Hereinafter, in a plan view as viewed from the axial direction, a direction intersecting the central axis O is referred to as a radial direction, and a direction going around the central axis O is referred to as a circumferential direction.

For example, ethylene glycol, water, silicone oil, or the like is enclosed in the liquid chamber 114. The vibration-damping device 11 is applied to, for example, a cabin mount or the like, and is used in a state where the axial direction is directed in the vertical direction.

The outer attachment member 111 includes a first end member 117 and a second end member 118 to which a pair of first main body rubbers 113a and 113b is respectively coupled, an intermediate member 116 to which a partition member 115 is coupled, and an outer plate member 119 to which the second main body rubber 130 is coupled.

The first end member 117 and the second end member 118 are each formed in an annular shape and are disposed coaxially with the central axis O. The intermediate member 116 is formed in a tubular shape extending in the axial direction and is disposed coaxially with the central axis O. The first end member 117 and the second end member 118 are respectively fitted into both end portions of the intermediate member 116 in the axial direction.

Hereinafter, in the axial direction, a side where the first end member 117 is located with respect to the second end member 118 is referred to as an upper side, and a side where the second end member 118 is located with respect to the first end member 117 is referred to as a lower side.

An upper end portion of the first end member 117 is located to project upward with respect to the intermediate member 116 over the entire circumferential length. A first flange portion 117a is provided at the upper end portion of the first end member 117 to project radially outward and cover an upper end opening edge 116a of the intermediate member 116. An upper surface of the first flange portion 117a is flush with an upper end surface of the first end member 117.

In addition, the first flange portion 117a may not be provided on the first end member 117. The first end member 117 may be located within the intermediate member 116 over the entire length in the axial direction.

A projecting rib 117d that projects upward and extends in the circumferential direction is formed on the upper end surface of the first end member 117. The projecting rib 117d is formed on an inner circumferential edge portion of the upper end surface of the first end member 117. The projecting rib 117d extends continuously over the entire circumferential length. The projecting rib 117d may not be formed on the first end member 117.

The projecting rib 117d is fitted into an attachment hole 135a formed in a coupled portion 135, which will be described below. Accordingly, it is possible to suppress the relative positional deviation between the first end member 117 and the coupled portion 135, and it is possible to suppress a situation in which when vibration is input, the first end member 117 and the coupled portion 135 collide with each other and make an abnormal noise.

A lower end portion of the second end member 118 is located to project downward with respect to the intermediate member 116 over the entire circumferential length. A second flange portion 118a is provided at the lower end portion of the second end member 118 to project radially outward and cover a lower end opening edge 116b of the intermediate member 116. A lower surface of the second flange portion 118a is flush with a lower end surface of the second end member 118.

In addition, the second flange portion 118a may not be provided on the second end member 118. The second end member 118 may be located within the intermediate member 116 over the entire length in the axial direction.

A first mounting projecting portion 124 is provided on an outer circumferential surface of the intermediate member 116 to project radially outward. The second end member 118 is provided with a second mounting projecting portion 125 that projects radially outward. The circumferential positions of the first mounting projecting portion 124 and the second mounting projecting portion 125 are equal to each other. The first mounting projecting portions 124 and the second mounting projecting portions 125 are each provided on both sides of the central axis O in the radial direction.

The first mounting projecting portion 124 is provided over the entire length in the axial direction on the outer circumferential surface of the intermediate member 116. A lower end surface of the first mounting projecting portion 124 is flush with the lower end opening edge 116b of the intermediate member 116. An upper end portion of the first mounting projecting portion 124 is located to project upward with respect to the intermediate member 116. In addition, an upper end surface of the first mounting projecting portion 124 may be flush with the upper end opening edge 116a of the intermediate member 116. The first flange portion 117a is not disposed on the upper end surface of the first mounting projecting portion 124, but the coupled portion 135 provided in any one of the vibration generating part and the vibration receiving part is disposed on the upper end surface. An inner surface 124a, facing radially inward, of the surface of the upper end portion of the first mounting projecting portion 124, is a flat surface that extends in the axial direction and extends along a straight line circumscribed on an inner circumferential surface of the intermediate member 116 when viewed from the axial direction. An outer circumferential surface of the first flange portion 117a is sandwiched in the radial direction between the respective inner surfaces 124a of the upper end portions of the pair of first mounting projecting portions 124 in abutment against or in close proximity to the inner surfaces 124a.

The first flange portion 117a is provided with a chamfered portion 117b extending along the inner surface 124a of the upper end portion of the first mounting projecting portion 124 when viewed from the axial direction. The chamfered portions 117b are provided on both sides of the central axis O in the radial direction. A pair of the chamfered portions 117b is sandwiched in the radial direction between the respective inner surfaces 124a at the upper end portions of a pair of the first mounting projecting portions 124. The upper surface of the first flange portion 117a and the upper end surface of the first end member 117 are located at axial positions equal to the upper end surface of the first mounting projecting portion 124.

The second mounting projecting portion 125 is provided on the second flange portion 118a of the second end member 118. The second mounting projecting portion 125 projects radially outward from the second flange portion 118a. The second mounting projecting portion 125 is formed in a plate shape having a thickness in the axial direction. The plate thicknesses of the second mounting projecting portion 125 and the second flange portion 118a are the same as each other. The upper and lower surfaces of the second mounting projecting portion 125 are flush with the upper and lower surfaces of the second flange portion 118a. The upper surface of the second mounting projecting portion 125 is disposed on the lower end surface of the first mounting projecting portion 124.

The plate thickness of the second mounting projecting portion 125 is larger than the plate thickness of the first flange portion 117a. In addition, the plate thickness of the second mounting projecting portion 125 may be equal to or less than the plate thickness of the first flange portion 117a.

The first mounting projecting portion 124 and the second mounting projecting portion 125 are separately provided with insertion holes 111a through which fixing bolts 136 for integrally fixing the first mounting projecting portion 124 and the second mounting projecting portion 125 and for coupling the first mounting projecting portion 124 to the coupled portion 135 are inserted.

Here, the outer plate member 119 is disposed above the first end member 117 and the first mounting projecting portion 124. The respective upper end surfaces of the first end member 117 and the first mounting projecting portion 124, the upper surface of the first flange portion 117a, and a lower surface of the outer plate member 119 sandwich the coupled portion 135 in the axial direction therebetween.

The fixing bolt 136 is inserted into the insertion hole 111a from below and penetrates the second mounting projecting portion 125, the first mounting projecting portion 124, and the outer plate member 119 in the axial direction integrally with the coupled portion 135. A nut 137 is screwed to the portion of the fixing bolt 136 that projects upward from the outer plate member 119, whereby the second mounting projecting portion 125, the first mounting projecting portion 124, and the outer plate member 119 are integrally fixed, and the first mounting projecting portion 124 is coupled to the coupled portion 135 without interposing the first end member 117. In the shown example, a tubular body 125a is fitted into the insertion hole 111a of the second mounting projecting portion 125. The fixing bolt 136 is inserted into the insertion hole 111a of the first mounting projecting portion 124 through the inside of the tubular body 125a. The fixing bolt 136 is press-fitted into the tubular body 125a.

An upper portion of an outer circumferential surface of a portion of the first end member 117, which is located below the upper end portion and fitted into the intermediate member 116, is provided with a first inclined surface 117c that extends radially inward toward the top. The first inclined surface 117c is provided on a portion of the first end member 117 separated from the pair of the chamfered portions 117b in the circumferential direction. The first inclined surfaces 117c are provided on both sides of the central axis O in the radial direction.

A lower portion of an outer circumferential surface of a portion of the first end member 117, which is located below the upper end portion and fitted into the intermediate member 116, extends substantially straight in the axial direction over the entire circumferential length.

A lower portion of an outer circumferential surface of a portion of the second end member 118, which is located above the lower end portion and fitted into the intermediate member 116, is provided with a second inclined surface 118c that extends radially outward toward the top. The second inclined surface 118c is provided at a portion of the second end member 118 that is separated from a pair of the second mounting projecting portions 125 in the circumferential direction. The second inclined surfaces 118c are provided on both sides of the central axis O in the radial direction.

An upper portion of an outer circumferential surface of a portion of the second end member 118, which is located above the lower end portion and is fitted into the intermediate member 116, extends substantially straight in the axial direction over the entire circumferential length.

The inclination angles of the first inclined surface 117c and the second inclined surface 118c with respect to the axial direction are the same as each other. The first inclined surface 117c and the second inclined surface 118c extend in the circumferential direction. Circumferential central portions of the first inclined surface 117c and the second inclined surface 118c axially adjacent to each other coincide with each other. The circumferential length of the first inclined surface 117c is larger than the circumferential length of the second inclined surface 118c.

A first crimping portion 128 for crimping an outer circumferential surface of the first end member 117 is formed at an upper end portion of the intermediate member 116. A second crimping portion 129 for crimping an outer circumferential surface of the second end member 118 is formed at a lower end portion of the intermediate member 116. The first crimping portion 128 and the second crimping portion 129 are formed in the intermediate member 116 at a portion separated from the insertion hole 111a of the first mounting projecting portion 124 in the circumferential direction. In the shown example, the first crimping portion 128 and the second crimping portion 129 are formed in the intermediate member 116 at a portion separated from the first mounting projecting portion 124 in the circumferential direction. First crimping portions 128 and second crimping portions 129 are each provided on both sides of the central axis O in the radial direction.

Both the inner circumferential surface and the outer circumferential surface of each of the first crimping portion 128 and the second crimping portion 129 extend radially inward toward the outside in the axial direction. The inner circumferential surface of the first crimping portion 128 crimps the first inclined surface 117c over almost the entire region, and the inner circumferential surface of the second crimping portion 129 crimps the second inclined surface 118c over almost the entire region. The outer circumferential surface of the first crimping portion 128 is covered with the first flange portion 117a from above, and the outer circumferential surface of the second crimping portion 129 is covered with the second flange portion 118a from below.

Figure 3:
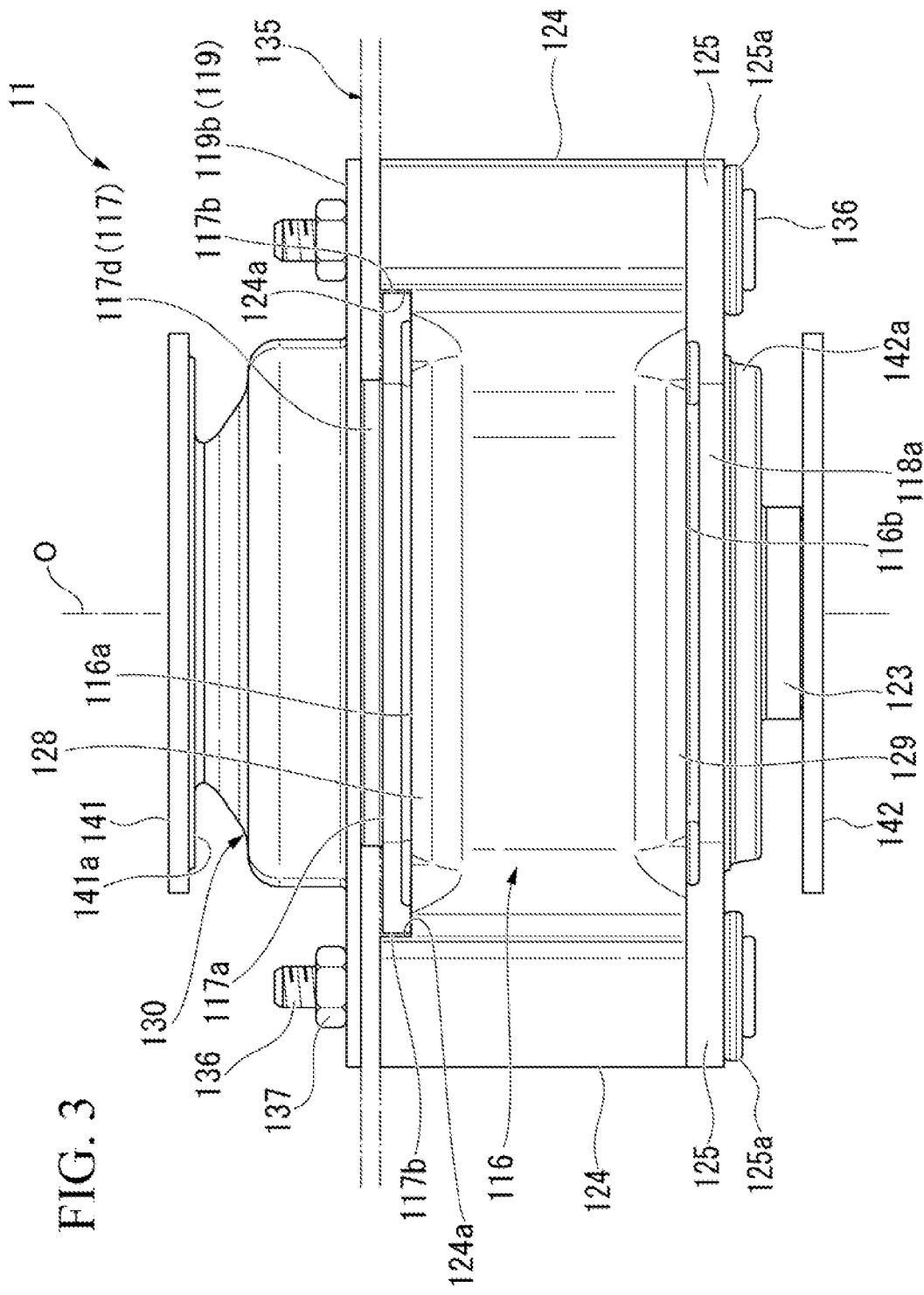
FIG. 3 is a view taken along line III of FIG. 1.

The inclination angles of the first crimping portion 128 and the second crimping portion 129 with respect to the axial direction are the same as each other. As shown in FIG. 3, the first crimping portion 128 and the second crimping portion 129 extend in the circumferential direction. The circumferential central portions of the first crimping portion 128 and the second crimping portion 129 axially adjacent to each other coincide with each other. The circumferential length of the first crimping portion 128 is larger than the circumferential length of the second crimping portion 129. The circumferential distance between the second crimping portions 129 that are adjacent to each other in the circumferential direction is smaller than the circumferential length of the second crimping portion 129.

A crimped portion of the first end member 117 in the circumferential direction, which is crimped by the first crimping portion 128, projects upward from the intermediate member 116. In the shown example, as described above, the upper end portion of the first end member 117 projects upward from the intermediate member 116 over the entire circumferential length. The first inclined surface 117c is formed on an outer circumferential surface of the crimped portion of the first end member 117. The above-mentioned first flange portion 117a is provided over the entire circumferential length at the upper end portion of the first end member 117 including the crimped portion.

In addition, only in the crimped portion of the first end member 117, an upper end portion may be made to project upward from the intermediate member 116 or may be provided with the first flange portion 117a.

The outer plate member 119 is formed in an annular shape and is disposed coaxially with the central axis O. The outer plate member 119 includes an inner portion 119a buried in the second main body rubber 130 and an outer portion 119b projecting radially outward from the second main body rubber 130.

The inner portion 119a includes an annular top wall 119c of which the front and back surfaces face in the axial direction, an inner tubular portion 119d extending downward from a radially inner end portion of the annular top wall 119c, an outer tubular portion 119e extending downward from a radially outer end portion of the annular top wall 119c, and a receiving plate portion 119f extending radially inward from a lower end portion of the inner tubular portion 119d.

The outer portion 119b extends radially outward from a lower end portion of the outer tubular portion 119e and is formed in an annular shape. The outer portion 119b is formed in a plate shape of which the front and back surfaces face in the axial direction. A lower surface of the outer portion 119b is coupled to the coupled portion 135. The lower surface of the outer portion 119b axially faces the respective upper end surfaces of the first mounting projecting portion 124 and the first end member 117 and the upper surface of the first flange portion 117a via the coupled portion 135.

The receiving plate portion 119f axially faces the upper first main body rubber 113a of the pair of first main body rubbers 113a and 113b, which is located above. A connecting portion between the inner tubular portion 119d and the receiving plate portion 119f is curved to project radially outward. The receiving plate portion 119f, the connecting portion, and the inner tubular portion 119d are smoothly connected without a step, a corner portion, or the like. The projecting length of the receiving plate portion 119f directed radially inward from an inner circumferential surface of the inner tubular portion 119d is smaller than the radial width of the annular top wall 119c. A lower surface of the receiving plate portion 119f is located at an axial position equal to the lower surface of the outer portion 119b.

The second main body rubber 130 is disposed above the pair of first main body rubbers 113a and 113b. The second main body rubber 130 is axially adjacent to the upper first main body rubber 113a of the pair of first main body rubbers 113a and 113b, which is coupled to the first end member 117. The second main body rubber 130 is formed in a tubular shape and is disposed coaxially with the central axis O. A radial inside of the second main body rubber 130 is a mounting hole 130a that penetrates the second main body rubber 130 in the axial direction, and the inner attachment member 112 is press-fitted into the mounting hole 130a.

The inner attachment member 112 is disposed radially inside the outer attachment member 111. The inner attachment member 112 has a tubular shape and is disposed coaxially with the central axis O. An outer circumferential surface of the inner attachment member 112 is substantially parallel to the inner circumferential surface of the inner tubular portion 119*d* of the outer plate member 119. The outer circumferential surface of the inner attachment member 112 is separated radially inward from a radially inner end portion of the receiving plate portion 119*f*. Both end portions of the inner attachment member 112 in the axial direction are each located axially outside the outer attachment member 111. An upper end portion of the inner attachment member 112 is located above the second main body rubber 130.

A bound stopper 141 is disposed at the upper end portion of the inner attachment member 112, and a rebound stopper 142 is disposed at a lower end portion of the inner attachment member 112. The bound stopper 141 and the rebound stopper 142 are each formed in an annular shape and are disposed coaxially with the central axis O. The bound stopper 141 and the rebound stopper 142 are each formed in a plate shape of which the front and back surfaces face in the axial direction.

The bound stopper 141 axially faces the inner portion 119*a* of the outer plate member 119 and sandwiches at least the inner tubular portion 119*d* and the receiving plate portion 119*f* in the axial direction between the bound stopper 141 and the upper first main body rubber 113*a*. A lower surface of the bound stopper 141 axially facing the outer plate member 119 is substantially parallel to an upper surface of the annular top wall 119*c* of the outer plate member 119. A bound stopper rubber 141*a* is disposed on a lower surface of the bound stopper 141. The bound stopper rubber 141*a* is bonded to the bound stopper 141. The bound stopper rubber 141*a* extends continuously over the entire circumferential length. The bound stopper rubber 141*a* is formed integrally with the second main body rubber 130. A radially inner portion of the bound stopper rubber 141*a* is axially connected to an inner circumferential portion of the second main body rubber 130, and a lower surface of a radially outer portion thereof faces an upper surface of an outer circumferential portion of the second main body rubber 130 with an axial gap. The lower surface of the radially outer portion of the bound stopper rubber 141*a* axially faces the annular top wall 119*c* of the outer plate member 119 via the outer circumferential portion of the second main body rubber 130.

The rebound stopper 142 axially faces the lower end surface of the second end member 118. A rebound stopper rubber 142*a*, which projects to a side opposite to the liquid chamber 114 side in the axial direction, that is, downward, and axially faces an upper surface of the rebound stopper 142, is disposed on the lower end surface of the second end member 118. The rebound stopper rubber 142*a* is disposed on a radially inner portion on the lower end surface of the second end member 118 and axially faces an outer circumferential portion of the rebound stopper 142. The rebound stopper rubber 142*a* extends continuously over the entire circumferential length. The rebound stopper rubber 142*a* is formed integrally with the lower first main body rubber 113*b* of the pair of first main body rubbers 113*a* and 113*b*, which is located on the lower side.

The upper first main body rubber 113*a* is formed in an annular shape and is disposed coaxially with the central axis O. A radially inner end portion of the upper first main body rubber 113*a* is bonded to the outer circumferential surface of the inner attachment member 112, and a radially outer end portion thereof is bonded to the first end member 117.

The lower first main body rubber 113*b* is formed in an annular shape and is disposed coaxially with the central axis O. A radially inner end portion of the lower first main body rubber 113*b* is in pressure contact with the outer circumferential surface of the inner attachment member 112 in a non-bonded state, and a radially outer end portion thereof is bonded to the second end member 118.

An outer surface of the upper first main body rubber 113*a* facing upward (a side opposite to the liquid chamber 114 side in the axial direction) and axially facing the second main body rubber 130 is inclined with respect to both the radial direction and the axial direction in a vertical cross-sectional view in the axial direction. In the shown example, an outer surface of the upper first main body rubber 113*a* extends downward from the inside toward the outside in the radial direction. The outer surface of the upper first main body rubber 113*a* is axially separated from the second main body rubber 130 and the outer plate member 119 from the inside toward the outside in the radial direction.

The partition member 115 has an annular shape and is disposed in the liquid chamber 114. An outer circumferential surface of the partition member 115 is coupled to an inner circumferential surface of the outer attachment member 111, and an inner circumferential surface of the partition member 115 is coupled to the outer circumferential surface of the inner attachment member 112. The partition member 115 partitions the liquid chamber 114 into a first liquid chamber 126 and a second liquid chamber 127 in the axial direction.

The partition member 115 is provided with a restriction passage 121 that allows the first liquid chamber 126 and the second liquid chamber 127 to communicate with each other. The restriction passage 121 extends beyond 360° around the central axis O.

The partition member 115 includes an annular elastic portion 132 in which a radially outer end portion is coupled to the outer attachment member 111, and an annular rigid body portion 133 in which the inner attachment member 112 is fitted inside and in which the radially outer end portion is coupled to the elastic portion 132. The elastic portion 132 and the rigid body portion 133 are each disposed coaxially with the central axis O. The elastic portion 132 is formed of, for example, a rubber material having a hardness lower than that of the rigid body portion 133. A radially inner end portion of the elastic portion 132 and a radially outer end portion of the rigid body portion 133 are coupled to each other. The elastic portion 132 is bonded to the inner circumferential surface of the intermediate member 116 of the outer attachment member 111 and the radially outer end portion of the rigid body portion 133. A stepped portion 112*a* formed on the outer circumferential surface of the inner attachment member 112 abuts against an upper surface of a radially inner end portion of the rigid body portion 133.

The rigid body portion 133 includes a rigid body portion main body 134 that has an orifice groove 133*a* for allowing the first liquid chamber 126 and the second liquid chamber 127 to communicate with each other formed in a lower surface thereof, and a lid 122 that is disposed on the lower surface of the rigid body portion main body 134 and defines the restriction passage 121 by blocking a lower opening in the orifice groove 133*a*.

The rigid body portion main body 134 and the lid 122 are each disposed coaxially with the central axis O. The rigid body portion main body 134 has a larger axial size and a larger radial size than the lid 122.

A press-fitting hole 134*a* into which the lid 122 is press-fitted is formed on the lower surface of the rigid body portion main body 134. The depth of the press-fitting hole 134*a* is larger than the axial size of the lid 122. The orifice groove 133*a* is open to a bottom surface of the press-fitting hole 134*a*. An inner circumferential edge portion, which is located radially inside the press-fitting hole 134a, on the lower surface of the rigid body portion main body 134, is located above an outer circumferential edge portion located radially outside the press-fitting hole 134a. The axial positions of the inner circumferential edge portions of the lower surface of the lid 122 and the lower surface of the rigid body portion main body 134 are equal to each other.

A first opening portion 134b that is open to one end portion of the orifice groove 133a in the circumferential direction is formed on the upper surface of the rigid body portion main body 134. The lid 122 is provided with a second opening portion 122a that is open to the other end portion of the orifice groove 133a in the circumferential direction.

Here, a support metal fitting 123 that sandwiches the lid 122 between the support metal fitting 123 and the bottom surface of the press-fitting hole 134a is buried in the lower first main body rubber 113b. The support metal fitting 123 is formed in a tubular shape and is disposed coaxially with the central axis O. The support metal fitting 123 is buried in an inner circumferential edge portion of the lower first main body rubber 113b. An upper end opening edge of the support metal fitting 123 is located flush with or slightly below an upper surface of the inner circumferential edge portion of the lower first main body rubber 113b. The upper end opening edge of the support metal fitting 123 supports an inner circumferential edge portion on the lower surface of the lid 122. In addition, the upper end opening edge of the support metal fitting 123 may support an outer circumferential edge portion or a radially intermediate portion on the lower surface of the lid 122.

An upper end portion of the support metal fitting 123 has a larger inner diameter and a larger outer diameter than a portion located below the upper end portion, and is located radially outside this portion. A part of the lower first main body rubber 113b is filled inside the upper end portion of the support metal fitting 123. A portion (hereinafter referred to as an annular seal portion) 113c of the lower first main body rubber 113b, which is located inside the upper end portion of the support metal fitting 123, extends continuously over the entire circumferential length. The annular seal portion 113c straddles and is in pressure contact with the lower surface of the lid 122 and the lower surface of the rigid body portion main body 134. The annular seal portion 113c is in pressure contact with the inner circumferential edge portion of the lower surface of each of the lid 122 and the rigid body portion main body 134.

In the above configuration, the second main body rubber 130 mainly supports a static load applied to the vibration-damping device 11 and suppresses the axial relative displacement of the outer attachment member 111 and the inner attachment member 112, while the first main body rubbers 113a and 113b are elastically deformed and the liquid in the liquid chamber 114 is made to flow between the first liquid chamber 126 and the second liquid chamber 127 through the restriction passage 121 when the axial vibration is input, so that the vibration can be damped and absorbed. That is, the vibration-damping device 11 has a configuration in which a vibration-damping rubber and a liquid-sealed vibration-damping device are directly coupled to each other in the axial direction.

As described above, according to the vibration-damping device 11 according to the present embodiment, the coupled portion 135 is disposed on any one end surface of both end surfaces of the first mounting projecting portion 124 in the axial direction, the second mounting projecting portion 125 is disposed on the other end surface thereof, and the first end member 117 is not axially sandwiched by the coupled portion 135 and the first mounting projecting portion 124. Thus, it is possible to reduce the number of members to be sandwiched in the axial direction, and it is possible to suppress the generation of abnormal noise when the vibration is input.

The first end member 117 is fitted in the intermediate member 116 and is crimped by the first crimping portion 128 having a larger circumferential length than the second crimping portion 129 for crimping the second end member 118. Thus, the first end member 117 can be firmly fixed to the intermediate member 116 without being coupled to the first mounting projecting portion 124 by using the fixing bolt 136.

Since the crimped portion of the first end member 117 projects upward from the intermediate member 116, it is possible to secure the stiffness of the crimped portion of the first end member 117, and the crimped portion of the first end member 117 can be prevented from being deformed when being crimped to the first crimping portion 128.

Since the first flange portion 117a is provided on the crimped portion of the first end member 117, the stiffness of the crimped portion of the first end member 117 can be reliably secured.

Since the plate thickness of the second mounting projecting portion 125 is larger than the plate thickness of the first flange portion 117a, it is possible to secure the stiffness of the second mounting projecting portion 125 having the insertion hole 111a through which the fixing bolt 136 is inserted, and the second mounting projecting portion 125 can be firmly fixed to the first mounting projecting portion 124.

Since the first crimping portion 128 and the second crimping portion 129 are formed in the intermediate member 116 at a portion separated from the insertion hole 111a of the first mounting projecting portion 124 in the circumferential direction, the first crimping portion 128 and the second crimping portion 129 can be easily formed.

In addition, the technical scope of the present invention is not limited to the above embodiment, and various changes can be made within the scope of the present invention.

For example, in the above embodiment, a configuration in which the lower first main body rubber 113b is in pressure contact with the outer circumferential surface of the inner attachment member 112 in a non-bonded state and the upper first main body rubber 113a is bonded to the outer circumferential surface of the inner attachment member 112 has been shown. However, a configuration in which the upper first main body rubber 113a is in pressure contact with the outer circumferential surface of the inner attachment member 112 in a non-bonded state, and the lower first main body rubber 113b is bonded to the outer circumferential surface of the inner attachment member 112 may be adopted.

Additionally, in the above embodiment, a configuration in which the outer surface of the upper first main body rubber 113a extends downward from the inside toward the outside in the radial direction has been shown. However, the outer surface of the upper first main body rubber 113a may extend downward from the outside toward the inside in the radial direction or may extend straight in the radial direction.

Additionally, in the above embodiment, a configuration in which the support metal fitting 123 is buried in the lower first main body rubber 113b has been shown. However, the lid 122 may be sandwiched between the bottom surface of the press-fitting hole 134a and the lower first main body rubber 113b in which the support metal fitting 123 is not buried.

Additionally, in the above embodiment, a configuration in which the lower first main body rubber 113b straddles and is in pressure contact with the lower surface of the lid 122 and the lower surface of the rigid body portion main body 134 has been shown. However, a configuration in which the lower first main body rubber 113b does not abut against both the lower surface of the lid 122 and the lower surface of the rigid body portion main body 134, or a configuration in which the lower first main body rubber 113b abuts on any one of the lower surface of the lid 122 and the lower surface of the rigid body portion main body 134 may be adopted.

Additionally, in the above embodiment, a configuration in which the second main body rubber 130, and the outer plate member 119 are disposed above the pair of the first main body rubbers 113a and 113b and the first end member 117 has been shown. However, a configuration in which the second main body rubber 130, and the outer plate member 119 are disposed below the pair of first main body rubbers 113a and 113b and the second end member 118 may be adopted.

Additionally, the second main body rubber 130 may be bonded to the outer circumferential surface of the inner attachment member 112.

Additionally, the present invention can also be applied to a vibration-damping device having no second main body rubber 130 and outer plate member 119.

Additionally, a configuration may be adopted that does not have at least one of the annular top wall 119c, the inner tubular portion 119d, the outer tubular portion 119e, and the receiving plate portion 119f as the inner portion 119a of the outer plate member 119.

Additionally, the present invention can also be applied to a vibration-damping device that does not have the bound stopper 141, the bound stopper rubber 141a, the rebound stopper 142, and the rebound stopper rubber 142a.

For example, in the above embodiment, the partition member 115 including the elastic portion 132 and the rigid body portion 133 has been shown. However, the present invention is not limited to such an aspect, and for example, a configuration in which the partition member 115 includes only the rigid body portion may be adopted.

Additionally, the restriction passage 121 may extend less than 360° around the central axis O.

Additionally, the orifice groove 133a may be formed on an outer circumferential surface of the rigid body portion main body 134.

The vibration-damping device 11 is not limited to a cabin mount of a vehicle and can be applied to those other than the cabin mount. The vibration-damping device can be applied to, for example, an engine mount or a bush for a vehicle, a mount of a generator mounted on a construction machine or can be applied to a mount of a machine installed in a factory or the like.

In addition, it is possible to appropriately replace the constituent elements in the above-described embodiment with well-known constituent elements within the scope of the present invention as defined in the claims. Additionally, the above-described modification examples may be appropriately combined.

According to the present invention, the coupled portion is disposed on any one of both end surfaces of the first mounting projecting portion in the axial direction, the second mounting projecting portion is disposed on the other end surface thereof, and the first end member is not axially sandwiched by the coupled portion and the first mounting projecting portion. Thus, it is possible to reduce the number of members to be sandwiched in the axial direction, and it is possible to suppress the generation of abnormal noise when the vibration is input.

The first end member is fitted into the intermediate member and is crimped by the first crimping portion having a larger circumferential length than the second crimping portion for crimping the second end member. Thus, the first end member can be firmly fixed to the intermediate member without being coupled to the one end surface of the first mounting projecting portion by using the fixing bolt.

The crimped portion of the first end member in the circumferential direction, which is crimped by the first crimping portion, may project outward from the intermediate member in the axial direction.

In this case, since the crimped portion of the first end member projects axially outward from the intermediate member, it is possible to secure the stiffness of the crimped portion of the first end member, and the crimped portion of the first end member can be prevented from being deformed when being crimped to the first crimping portion.

The crimped portion of the first end member may be provided with a flange portion that projects radially outward and extends in the circumferential direction.

In this case, since the flange portion is provided on the crimped portion of the first end member, the stiffness of the crimped portion of the first end member can be reliably secured.

The second mounting projecting portion may be formed in a plate shape having a thickness in the axial direction, and the plate thickness of the second mounting projecting portion may be larger than the plate thickness of the flange portion.

In this case, since the plate thickness of the second mounting projecting portion is larger than the plate thickness of the flange portion, it is possible to secure the stiffness of the second mounting projecting portion having the insertion hole through which the fixing bolt is inserted, and the second mounting projecting portion can be firmly fixed to the first mounting projecting portion.

The first crimping portion and the second crimping portion may be formed in a portion of the intermediate member that is separated from the insertion hole of the first mounting projecting portion in the circumferential direction.

In this case, since the first crimping portion and the second crimping portion are formed in the intermediate member at a portion separated from the insertion hole of the first mounting projecting portion in the circumferential direction, the first crimping portion and the second crimping portion can be easily formed.

Hereinafter, a vibration-damping device 21 according to a second embodiment of the present invention will be described with reference to the drawings.

Figure 4:
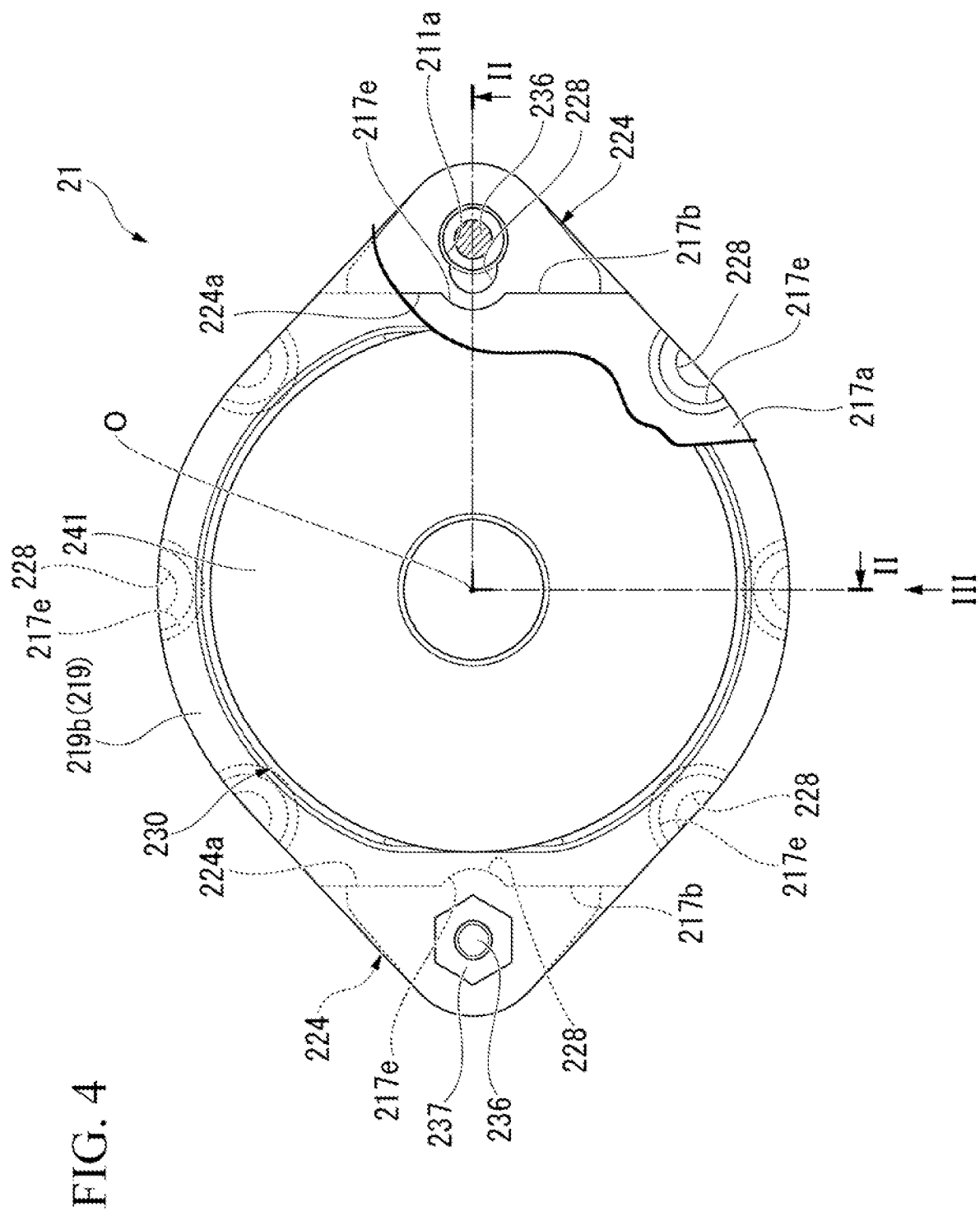
FIG. 4 is a top view of the vibration-damping device according to the embodiment of the present invention.
Figure 5:
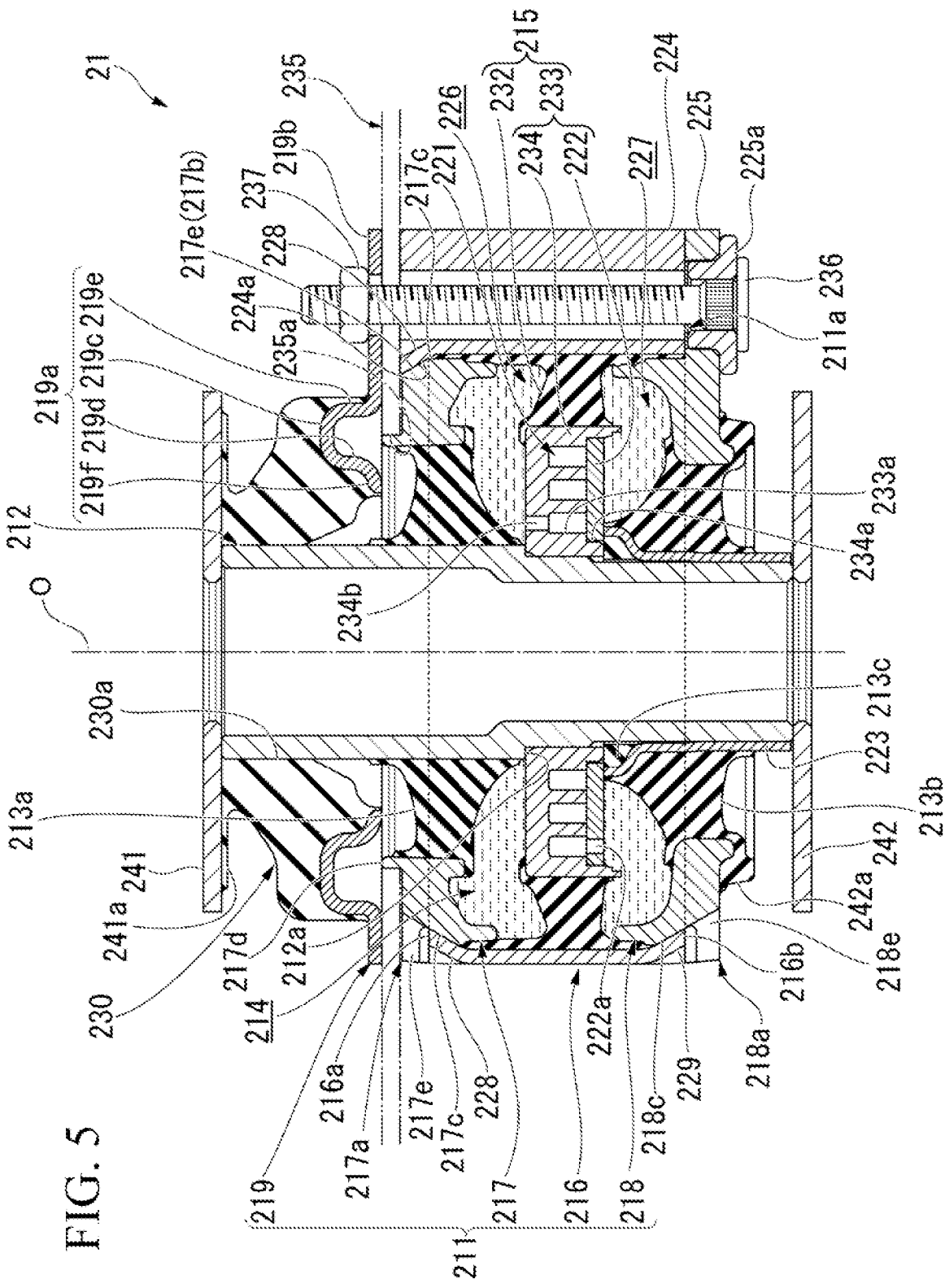
FIG. 5 is a cross-sectional view taken along line II-II of FIG. 4.

As shown in FIGS. 4 and 5, the vibration-damping device 21 includes a tubular outer attachment member 211 coupled to any one of a vibration generating part and a vibration receiving part, and an inner attachment member 212 coupled to the other thereof and disposed inside the outer attachment member 211, a pair of first main body rubbers 213a and 213b that couples the outer attachment member 211 and the inner attachment member 212 to each other and is disposed at a distance in an axial direction along a central axis O of the outer attachment member 211, a partition member 215 that partitions a liquid chamber 214 between the pair of first main body rubbers 213a and 213b in the axial direction, and a second main body rubber 230 that couples the outer attachment member 211 and the inner attachment member 212 to each other and is disposed axially outside the liquid chamber 214.

Hereinafter, in a plan view as viewed from the axial direction, a direction intersecting the central axis O is referred to as a radial direction, and a direction going around the central axis O is referred to as a circumferential direction.

For example, ethylene glycol, water, silicone oil, or the like is enclosed in the liquid chamber 214. The vibration-damping device 21 is applied to, for example, a cabin mount or the like, and is used in a state where the axial direction is directed in the vertical direction.

The outer attachment member 211 includes a first end member 217 and a second end member 218 to which the pair of first main body rubbers 213a and 213b is respectively coupled, an intermediate member 216 to which a partition member 215 is coupled, and an outer plate member 219 to which the second main body rubber 230 is coupled.

The first end member 217 and the second end member 218 are each formed in an annular shape and are disposed coaxially with the central axis O. The intermediate member 216 is formed in a tubular shape extending axially and is disposed coaxially with the central axis O. The first end member 217 and the second end member 218 are respectively fitted into both end portions of the intermediate member 216 in the axial direction.

Hereinafter, in the axial direction, a side where the first end member 217 is located with respect to the second end member 218 is referred to as an upper side, and a side where the second end member 218 is located with respect to the first end member 217 is referred to as a lower side.

An upper end portion (one end portion) of the first end member 217 is located to project upward with respect to the intermediate member 216 over the entire circumferential length. In addition, only a portion of the upper end portion of the first end member 217 radially adjacent to the first mounting projecting portion 224, which will be described below, may be located to project upward with respect to the intermediate member 216.

A first flange portion 217a is provided at the upper end portion of the first end member 217 to project radially outward and cover an upper end opening edge 216a of the intermediate member 216. An upper surface of the first flange portion 217a is flush with an upper end surface (one end surface) facing upward (a side opposite to the liquid chamber 214 side in the axial direction) out of both end surfaces of the first end member 217 in the axial direction.

In addition, the first flange portion 217a may not be provided on the first end member 217. The first end member 217 may be located within the intermediate member 216 over the entire length in the axial direction.

A projecting rib 217d that projects upward and extends in the circumferential direction is formed on the upper end surface of the first end member 217. The projecting rib 217d is formed on an inner circumferential edge portion of the upper end surface of the first end member 217. The projecting rib 217d extends continuously over the entire circumferential length. The projecting rib 217d is fitted in an attachment hole 235a formed in a coupled portion 235, which will be described below. The projecting rib 217d may not be formed on the first end member 217.

A lower end portion of the second end member 218 is located to project downward with respect to the intermediate member 216 over the entire circumferential length. A second flange portion 218a is provided at the lower end portion of the second end member 218 to project radially outward and cover a lower end opening edge 216b of the intermediate member 216. A lower surface of the second flange portion 218a is flush with a lower end surface of the second end member 218.

In addition, the second flange portion 218a may not be provided on the second end member 218. The second end member 218 may be located within the intermediate member 216 over the entire length in the axial direction.

A first mounting projecting portion 224 is provided on an outer circumferential surface of the intermediate member 216 to project radially outward. The second end member 218 is provided with a second mounting projecting portion 225 that projects radially outward. The circumferential positions of the first mounting projecting portion 224 and the second mounting projecting portion 225 are equal to each other. The first mounting projecting portions 224 and the second mounting projecting portions 225 are each provided on both sides of the central axis O in the radial direction.

The first mounting projecting portion 224 is provided over the entire length in the axial direction on the outer circumferential surface of the intermediate member 216. A lower end surface of the first mounting projecting portion 224 is flush with the lower end opening edge 216b of the intermediate member 216. An upper end portion (one end portion) of the first mounting projecting portion 224 is located to project upward with respect to the intermediate member 216. The upper end portion of the first mounting projecting portion 224 is radially adjacent to the upper end portion of the first end member 217. In addition, an upper end surface of the first mounting projecting portion 224 may be flush with the upper end opening edge 216a of the intermediate member 216. The first flange portion 217a is not disposed on the upper end surface of the first mounting projecting portion 224, but the coupled portion 235 provided in any one of the vibration generating part and the vibration receiving part is disposed on the upper end surface. An inner surface 224a, facing radially inward, of the surface of the upper end portion of the first mounting projecting portion 224, is a flat surface that extends in the axial direction and extends along a straight line circumscribed on an inner circumferential surface of the intermediate member 216 when viewed from the axial direction. An outer circumferential surface of the first flange portion 217a is sandwiched in the radial direction between the respective inner surfaces 224a of the upper end portions of a pair of the first mounting projecting portions 224 in abutment against or in close proximity to the inner surfaces 224a.

The first flange portion 217a is provided with a chamfered portion 217b extending along the inner surface 224a of the upper end portion of the first mounting projecting portion 224 when viewed from the axial direction. The chamfered portions 217b are provided on both sides of the central axis O in the radial direction. A pair of the chamfered portions 217b is sandwiched in the radial direction between the respective inner surfaces 224a at the upper end portions of the pair of first mounting projecting portions 224. The upper surface of the first flange portion 217a and the upper end surface of the first end member 217 are located at axial positions equal to the upper end surface of the first mounting projecting portion 224.

The second mounting projecting portion 225 is provided on the second flange portion 218a of the second end member 218. The second mounting projecting portion 225 projects radially outward from the second flange portion 218a. The second mounting projecting portion 225 is formed in a plate shape having a thickness in the axial direction. The plate thicknesses of the second mounting projecting portion 225 and the second flange portion 218a are the same as each other. The upper and lower surfaces of the second mounting projecting portion 225 are flush with the upper and lower surfaces of the second flange portion 218a. The upper surface of the second mounting projecting portion 225 is disposed on the lower end surface of the first mounting projecting portion 224.

The plate thickness of the second mounting projecting portion 225 is larger than the plate thickness of the first flange portion 217a. In addition, the plate thickness of the second mounting projecting portion 225 may be equal to or less than the plate thickness of the first flange portion 217a.

The first mounting projecting portion 224 and the second mounting projecting portion 225 are separately provided with insertion holes 211a through which fixing bolts 236 for integrally fixing the first mounting projecting portion 224 and the second mounting projecting portion 225 and for coupling the first mounting projecting portion 224 to the coupled portion 235 are inserted.

Here, the outer plate member 219 is disposed above the first end member 217 and the first mounting projecting portion 224. The respective upper end surfaces of the first end member 217 and the first mounting projecting portion 224, the upper surface of the first flange portion 217a, and a lower surface of the outer plate member 219 sandwich the coupled portion 235 in the axial direction therebetween.

The fixing bolt 236 is inserted into the insertion hole 211a from below and axially penetrates the second mounting projecting portion 225, the first mounting projecting portion 224, and the outer plate member 219 integrally with the coupled portion 235. A nut 237 is screwed to the portion of the fixing bolt 236 that projects upward from the outer plate member 219, whereby the second mounting projecting portion 225, the first mounting projecting portion 224, and the outer plate member 219 are integrally fixed and the first mounting projecting portion 224 is coupled to the coupled portion 235 without interposing the first end member 217. In the shown example, a tubular body 225a is fitted into the insertion hole 211a of the second mounting projecting portion 225. The fixing bolt 236 is inserted into the insertion hole 211a of the first mounting projecting portion 224 through the inside of the tubular body 225a. The fixing bolt 236 is press-fitted into the tubular body 225a.

A plurality of first inclined surfaces 217c extending radially inward toward the top are formed at intervals in the circumferential direction on an outer circumferential surface of the first end member 217.

Each first inclined surface 217c is formed in a portion extending from an upper end portion projecting upward with respect to the intermediate member 216 to an upper portion of the portion fitted into the intermediate member 216, in the outer circumferential surface of the first end member 217. The plurality of first inclined surfaces 217c are formed to have the same shape and the same size. Each first inclined surface 217c exhibits a curved shape that is recessed radially inward in a cross-sectional view orthogonal to the central axis O. The circumferential length of the first inclined surface 217c increases from the bottom toward the top when viewed from the outside in the radial direction.

A lower portion of an outer circumferential surface of a portion of the first end member 217, which is located below the upper end portion and fitted into the intermediate member 216, extends substantially straight in the axial direction over the entire circumferential length.

One of the plurality of first inclined surfaces 217c is formed on a portion of the outer circumferential surface of the first end member 217 radially adjacent to the first mounting projecting portion 224. In the shown example, the first inclined surface 217c is formed on a portion of the outer circumferential surface of the first end member 217 radially adjacent to the insertion hole 211a. The first inclined surface 217c is formed respectively on each of portions of the outer circumferential surface of the first end member 217 radially adjacent to the pair of first mounting projecting portions 224, and a plurality of the first inclined surfaces 217c are formed at intervals in the circumferential direction at each of intermediate portions separated from the pair of first mounting projecting portions 224 in the circumferential direction. An even number of first inclined surfaces 217c are provided on the first end member 217 and are provided at positions radially facing the other first inclined surfaces 217c.

In the first flange portion 217a, a first notched portion 217e is formed in each of portions axially connected to the plurality of first inclined surfaces 217c. A plurality of the first notched portions 217e are formed in each portion of the first flange portion 217a located between the pair of chamfered portions 217b, and one first notched portion is formed respectively in the pair of chamfered portions 217b. Each first notched portion 217e penetrates the first flange portion 217a in the axial direction and is open radially outward. The first notched portion 217e exhibits an arc shape that is open radially outward when viewed from the axial direction. An inner circumferential surface of the first notched portion 217e is coupled to the first inclined surface 217c without a step in the axial direction.

A plurality of second inclined surfaces 218c extending radially outward toward the top are formed at intervals in the circumferential direction on an outer circumferential surface of the second end member 218.

Each second inclined surface 218c is formed in a portion extending from a lower end portion projecting downward with respect to the intermediate member 216 to a lower portion of the portion fitted into the intermediate member 216, in the outer circumferential surface of the second end member 218. The plurality of second inclined surfaces 218c are formed to have the same shape and the same size. Each second inclined surface 218c exhibits a curved shape that is recessed radially inward in a cross-sectional view orthogonal to the central axis O. The circumferential length of the second inclined surface 218c increases from the top toward the bottom when viewed from the outside in the radial direction.

An upper portion of an outer circumferential surface of a portion of the second end member 218, which is located above the lower end portion and is fitted into the intermediate member 216, extends substantially straight in the axial direction over the entire circumferential length.

The plurality of second inclined surfaces 218c are provided at portions of the second end member 218 separated from a pair of the second mounting projecting portions 225 in the circumferential direction. The plurality of second inclined surfaces 218c are formed at intervals in the circumferential direction at each intermediate portion of the outer circumferential surface of the second end member 218 located between the pair of second mounting projecting portions 225. An even number of second inclined surfaces 218c are provided on the second end member 218 and are provided at positions radially facing the other second inclined surfaces 218c.

In the second flange portion 218a, a second notched portion 218e is formed in each of portions axially connected to the plurality of second inclined surfaces 218c. A plurality of the second notched portions 218e are formed in each portion of the second flange portion 218a located between the pair of second mounting projecting portions 225. Each second notched portion 218e penetrates the second flange portion 218a in the axial direction and is open radially outward. The second notched portion 218e exhibits an arc shape that is open radially outward when viewed from the axial direction. An inner circumferential surface of the second notched portion 218e is connected to the second inclined surface 218c without a step in the axial direction.

The inclination angles of the circumferential central portions of the first inclined surface 217c and the second inclined surface 218c with respect to the axial direction are equal to each other. The sizes of the first inclined surface 217c and the second inclined surface 218c are equal to each other.

One of the plurality of first inclined surfaces 217c is formed at the circumferential central portion of the intermediate portion on the outer circumferential surface of the first end member 217, one of the plurality of second inclined surfaces 218c is formed at the circumferential central portion of the intermediate portion on the outer circumferential surface of the second end member 218, and the first inclined surface 217c and the second inclined surface 218c axially face each other.

In the intermediate portion of the outer circumferential surface of the first end member 217, the circumferential distance between the first inclined surfaces 217c adjacent to each other in the circumferential direction is larger than the circumferential distance between the second inclined surfaces 218c adjacent to each other in the circumferential direction. In addition, the former distance may be set to be equal to or less than the latter distance.

In the shown example, the circumferential distance between the first inclined surface 217c formed on the portion of the outer circumferential surface of the first end member 217 radially adjacent to the first mounting projecting portion 224 and the other first inclined surfaces 217c adjacent to the first inclined surface 217c in the circumferential direction is smaller than the circumferential distance between the second inclined surfaces 218c adjacent to each other in the circumferential direction. In addition, the former distance may be equal to or larger than the latter distance.

First crimping portions 228 for crimping the first end member 217 are separately formed at intervals in the circumferential direction on the intermediate member 216 and the first mounting projecting portion 224.

The first crimping portions 228 are separately formed at the upper end portions of the intermediate member 216 and the first mounting projecting portion 224. In the first crimping portion 228 of the plurality of first crimping portions 228 formed on the intermediate member 216, an outer circumferential surface and an inner circumferential surface at an upper end portion of the intermediate member 216 are formed by extending radially inward toward the top. In the first crimping portion 228 formed at an upper end portion of the first mounting projecting portion 224, the inner surface 224a of the upper end portion of the first mounting projecting portion 224 and a portion of an inner circumferential surface of the insertion hole 211a, which is located at the upper end portion of the first mounting projecting portion 224, are located at the radially inner end portion, and faces the outside in the radial direction, is formed by extending radially inward toward the top.

Figure 6:
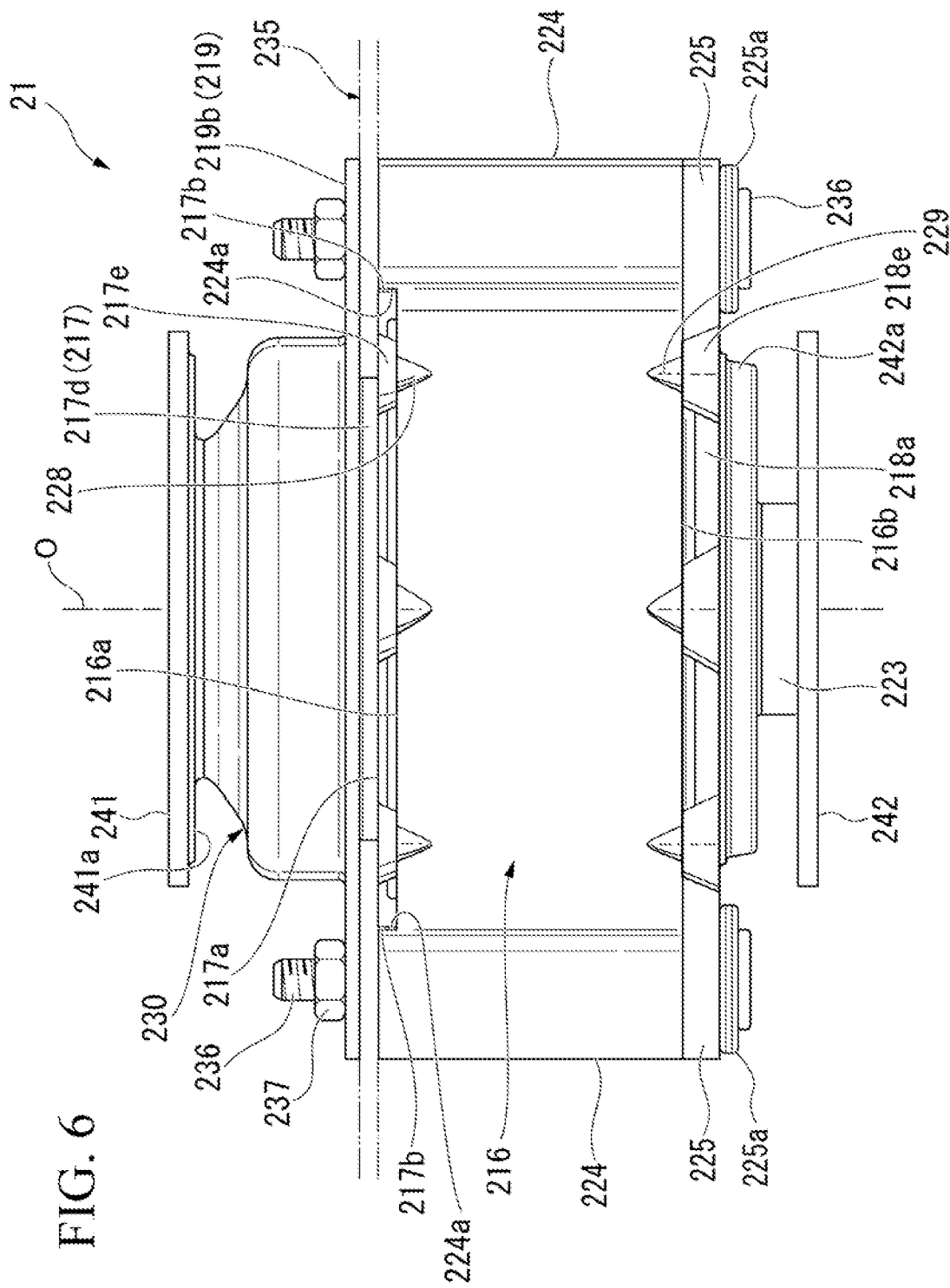
FIG. 6 is a view taken along line III of FIG. 4.

The plurality of first crimping portions 228 are formed to have the same shape and the same size. Each first crimping portion 228 exhibits a curved shape that is recessed radially inward in a cross-sectional view orthogonal to the central axis O. As shown in FIG. 6, the first crimping portion 228 has an increased circumferential length from the bottom toward the top when viewed from the outside in the radial direction.

The plurality of first crimping portions 228 are formed at intervals in the circumferential direction on the intermediate member 216 and one first crimping portion 228 is formed on each pair of first mounting projecting portions 224. The number of first crimping portions 228 is the same as the number of first inclined surfaces 217c. The plurality of first crimping portions 228 are provided at the same circumferential positions as those of the first inclined surface 217c. The plurality of first crimping portions 228 are separately fitted to the plurality of first inclined surfaces 217c. In addition, one first crimping portion 228 may be formed in the intermediate member 216.

An upper portion of the first crimping portion 228 of the plurality of first crimping portions 228 formed on the first mounting projecting portion 224 is located above the first crimping portion 228 formed on the intermediate member 216. The first crimping portion 228 of the plurality of first crimping portions 228 formed on the intermediate member 216 is located below the first flange portion 217a, and an upper portion of the first crimping portion 228 formed on the first mounting projecting portion 224 is fitted to the first notched portion 217e of the first flange portion 217a. An outer surface and an upper end opening edge of the first crimping portion 228 are open upward through the first notched portion 217e of the first flange portion 217a.

The first crimping portion 228 formed on the intermediate member 216 crimps a portion of the first end member 217 located below the upper end portion, and the first crimping portion 228 formed on the first mounting projecting portion 224 crimps the upper portion of the first end member 217 including the upper end portion and a portion located below the upper end portion.

A plurality of second crimping portions 229 for crimping the second end member 218 are formed at intervals in the circumferential direction on the intermediate member 216. In addition, the second crimping portion 229 may not be formed on the intermediate member 216.

The plurality of second crimping portions 229 are formed at a lower end portion of the intermediate member 216. The second crimping portion 229 is formed by an outer circumferential surface and an inner circumferential surface at the lower end portion of the intermediate member 216 extending radially inward toward the bottom. The plurality of second crimping portions 229 are formed in portions of the intermediate member 216 separated from the pair of first mounting projecting portions 224 in the circumferential direction.

The plurality of second crimping portions 229 are formed to have the same shape and the same size. Each second crimping portion 229 exhibits a curved shape that is recessed radially inward in a cross-sectional view orthogonal to the central axis O. The circumferential length of the second crimping portion 229 increases from the top toward the bottom when viewed from the outside in the radial direction.

The number of second crimping portions 229 is the same as the number of second inclined surfaces 218c. The plurality of second crimping portions 229 are provided at the same circumferential positions as those of the second inclined surface 218c. The plurality of second crimping portions 229 are separately fitted to the plurality of second inclined surfaces 218c. Each second crimping portion 229 is located above the second flange portion 218a. An outer surface and a lower end opening edge of the second crimping portion 229 are open downward through the second notched portion 218e of the second flange portion 218a.

The inclination angles of the circumferential central portions of the first crimping portion 228 and the second crimping portion 229 with respect to the axial direction are equal to each other. The sizes of the first crimping portion 228 and the second crimping portion 229 are equal to each other.

One of the plurality of first crimping portions 228 and one of the plurality of second crimping portions 229 are each formed in a circumferential central portion of an intermediate portion of the intermediate member 216, and the first crimping portion 228 and the second crimping portion 229 axially face each other.

In each intermediate portion of the intermediate member 216 located between the pair of first mounting projecting portions 224, the circumferential distance between the first crimping portions 228 adjacent to each other in the circumferential direction is larger than the circumferential distance between the second crimping portions 229 adjacent to each other in the circumferential direction. In addition, the former distance may be set to be equal to or less than the latter distance.

In the shown example, the circumferential distance between the first crimping portion 228 formed on the first mounting projecting portion 224 and the other first crimping portion 228 adjacent to the first crimping portion 228 in the circumferential direction and formed on the intermediate member 216 is smaller than the circumferential distance between the second crimping portions 229 adjacent to each other in the circumferential direction. In addition, the former distance may be equal to or larger than the latter distance.

The outer plate member 219 is formed in an annular shape and is disposed coaxially with the central axis O. The outer plate member 219 includes an inner portion 219a buried in the second main body rubber 230 and an outer portion 219b projecting radially outward from the second main body rubber 230.

The inner portion 219a includes an annular top wall 219c of which the front and back surfaces face in the axial direction, an inner tubular portion 219d extending downward from a radially inner end portion of the annular top wall 219c, an outer tubular portion 219e extending downward from a radially outer end portion of the annular top wall 219c, and a receiving plate portion 219f extending radially inward from a lower end portion of the inner tubular portion 219d.

The outer portion 219b extends radially outward from a lower end portion of the outer tubular portion 219e and is formed in an annular shape. The outer portion 219b is formed in a plate shape of which the front and back surfaces face in the axial direction. A lower surface of the outer portion 219b is coupled to the coupled portion 235. The lower surface of the outer portion 219b axially faces the respective upper end surfaces of the first mounting projecting portion 224 and the first end member 217 and the upper surface of the first flange portion 217a via the coupled portion 235.

The receiving plate portion 219f axially faces the upper first main body rubber 213a of the pair of first main body rubbers 213a and 213b, which is located above. A connecting portion between the inner tubular portion 219d and the receiving plate portion 219f is curved to project radially outward. The receiving plate portion 219f, the connecting portion, and the inner tubular portion 219d are smoothly connected without a step, a corner portion, or the like. The projecting length of the receiving plate portion 219f directed radially inward from an inner circumferential surface of the inner tubular portion 219d is smaller than the radial width of the annular top wall 219c. A lower surface of the receiving plate portion 219f is located at an axial position equal to the lower surface of the outer portion 219b.

The second main body rubber 230 is disposed above the pair of first main body rubbers 213a and 213b. The second main body rubber 230 is axially adjacent to the upper first main body rubber 213a of the pair of first main body rubbers 213a and 213b, which is coupled to the first end member 217. The second main body rubber 230 is formed in a tubular shape and is disposed coaxially with the central axis O. A radial inside of the second main body rubber 230 is a mounting hole 230a that penetrates the second main body rubber 230 in the axial direction, and the inner attachment member 212 is press-fitted into the mounting hole 230a.

The inner attachment member 212 is disposed radially inside the outer attachment member 211. The inner attachment member 212 has a tubular shape and is disposed coaxially with the central axis O. An outer circumferential surface of the inner attachment member 212 is substantially parallel to the inner circumferential surface of the inner tubular portion 219d of the outer plate member 219. The outer circumferential surface of the inner attachment member 212 is separated radially inward from a radially inner end portion of the receiving plate portion 219f. Both end portions of the inner attachment member 212 in the axial direction are each located axially outside the outer attachment member 211. An upper end portion of the inner attachment member 212 is located above the second main body rubber 230.

A bound stopper 241 is disposed at the upper end portion of the inner attachment member 212, and a rebound stopper 242 is disposed at a lower end portion of the inner attachment member 212. The bound stopper 241 and the rebound stopper 242 are each formed in an annular shape and are disposed coaxially with the central axis O. The bound stopper 241 and the rebound stopper 242 are each formed in a plate shape of which the front and back surfaces face in the axial direction.

The bound stopper 241 axially faces the inner portion 219a of the outer plate member 219 and sandwiches at least the inner tubular portion 219d and the receiving plate portion 219f in the axial direction between the bound stopper 241 and the upper first main body rubber 213a. A lower surface of the bound stopper 241 axially facing the outer plate member 219 is substantially parallel to an upper surface of the annular top wall 219c of the outer plate member 219. A bound stopper rubber 241a is disposed on a lower surface of the bound stopper 241. The bound stopper rubber 241a is bonded to the bound stopper 241. The bound stopper rubber 241a extends continuously over the entire circumferential length. The bound stopper rubber 241a is formed integrally with the second main body rubber 230. A radially inner portion of the bound stopper rubber 241a is axially connected to an inner circumferential portion of the second main body rubber 230, and a lower surface of a radially outer portion thereof faces an upper surface of an outer circumferential portion of the second main body rubber 230 with an axial gap. The lower surface of the radially outer portion of the bound stopper rubber 241a axially faces the annular top wall 219c of the outer plate member 219 via the outer circumferential portion of the second main body rubber 230.

The rebound stopper 242 axially faces the lower end surface of the second end member 218. A rebound stopper rubber 242a, which projects to a side opposite to the liquid chamber 214 side in the axial direction, that is, downward, and axially faces an upper surface of the rebound stopper 242, is disposed on the lower end surface of the second end member 218. The rebound stopper rubber 242a is disposed on a radially inner portion on the lower end surface of the second end member 218 and axially faces an outer circumferential portion of the rebound stopper 242. The rebound stopper rubber 242a extends continuously over the entire circumferential length. The rebound stopper rubber 242a is formed integrally with the lower first main body rubber 213b of the pair of first main body rubbers 213a and 213b, which is located on the lower side.

The upper first main body rubber 213a is formed in an annular shape and is disposed coaxially with the central axis O. A radially inner end portion of the upper first main body rubber 213a is bonded to the outer circumferential surface of the inner attachment member 212, and a radially outer end portion thereof is bonded to the first end member 217.

The lower first main body rubber 213b is formed in an annular shape and is disposed coaxially with the central axis O. A radially inner end portion of the lower first main body rubber 213b is in pressure contact with the outer circumferential surface of the inner attachment member 212 in a non-bonded state, and a radially outer end portion thereof is bonded to the second end member 218.

An outer surface of the upper first main body rubber 213a facing upward (a side opposite to the liquid chamber 214 side in the axial direction) and axially facing the second main body rubber 230 is inclined with respect to both the radial direction and the axial direction in a vertical cross-sectional view in the axial direction. In the shown example, an outer surface of the upper first main body rubber 213a extends downward from the inside toward the outside in the radial direction. The outer surface of the upper first main body rubber 213a is axially separated from the second main body rubber 230 and the outer plate member 219 from the inside toward the outside in the radial direction.

The partition member 215 has an annular shape and is disposed in the liquid chamber 214. An outer circumferential surface of the partition member 215 is coupled to an inner circumferential surface of the outer attachment member 211, and an inner circumferential surface of the partition member 215 is coupled to the outer circumferential surface of the inner attachment member 212. The partition member 215 partitions the liquid chamber 214 into a first liquid chamber 226 and a second liquid chamber 227 in the axial direction.

The partition member 215 is provided with a restriction passage 221 that allows the first liquid chamber 226 and the second liquid chamber 227 to communicate with each other. The restriction passage 221 extends beyond 360° around the central axis O.

The partition member 215 includes an annular elastic portion 232 in which a radially outer end portion is coupled to the outer attachment member 211, and an annular rigid body portion 233 in which the inner attachment member 212 is fitted inside and in which the radially outer end portion is coupled to the elastic portion 232. The elastic portion 232 and the rigid body portion 233 are each disposed coaxially with the central axis O. The elastic portion 232 is formed of, for example, a rubber material having a hardness lower than that of the rigid body portion 233. A radially inner end portion of the elastic portion 232 and a radially outer end portion of the rigid body portion 233 are coupled to each other. The elastic portion 232 is bonded to the inner circumferential surface of the intermediate member 216 of the outer attachment member 211 and the radially outer end portion of the rigid body portion 233. A stepped portion 212a formed on the outer circumferential surface of the inner attachment member 212 abuts against an upper surface of a radially inner end portion of the rigid body portion 233.

The rigid body portion 233 includes a rigid body portion main body 234 that has an orifice groove 233a for allowing the first liquid chamber 226 and the second liquid chamber 227 to communicate with each other formed in a lower surface thereof, and a lid 222 that is disposed on the lower surface of the rigid body portion main body 234 and defines the restriction passage 221 by blocking a lower opening in the orifice groove 233a.

The rigid body portion main body 234 and the lid 222 are each disposed coaxially with the central axis O. The rigid body portion main body 234 has a larger axial size and a larger radial size than the lid 222.

A press-fitting hole 234a into which the lid 222 is press-fitted is formed on the lower surface of the rigid body portion main body 234. The depth of the press-fitting hole 234a is larger than the axial size of the lid 222. The orifice groove 233a is open to a bottom surface of the press-fitting hole 234a. An inner circumferential edge portion, which is located radially inside the press-fitting hole 234a, on the lower surface of the rigid body portion main body 234, is located above an outer circumferential edge portion located radially outside the press-fitting hole 234a. The axial positions of the inner circumferential edge portions of the lower surface of the lid 222 and the lower surface of the rigid body portion main body 234 are equal to each other.

A first opening portion 234b that is open to one end portion of the orifice groove 233a in the circumferential direction is formed on the upper surface of the rigid body portion main body 234. The lid 222 is provided with a second opening portion 222a that is open to the other end portion of the orifice groove 233a in the circumferential direction.

Here, a support metal fitting 223 that sandwiches the lid 222 between the support metal fitting 223 and the bottom surface of the press-fitting hole 234a is buried in the lower first main body rubber 213b. The support metal fitting 223 is formed in a tubular shape and is disposed coaxially with the central axis O. The support metal fitting 223 is buried in an inner circumferential edge portion of the lower first main body rubber 213b. An upper end opening edge of the support metal fitting 223 is located flush with or slightly below an upper surface of the inner circumferential edge portion of the lower first main body rubber 213b. The upper end opening edge of the support metal fitting 223 supports an inner circumferential edge portion on the lower surface of the lid 222. In addition, the upper end opening edge of the support metal fitting 223 may support an outer circumferential edge portion or a radially intermediate portion on the lower surface of the lid 222.

An upper end portion of the support metal fitting 223 has a larger inner diameter and a larger outer diameter than a portion located below the upper end portion and is located radially outside this portion. A part of the lower first main body rubber 213b is filled inside the upper end portion of the support metal fitting 223. A portion (hereinafter referred to as an annular seal portion) 213c of the lower first main body rubber 213b, which is located inside the upper end portion of the support metal fitting 223, extends continuously over the entire circumferential length. The annular seal portion 213c straddles and is in pressure contact with the lower surface of the lid 222 and the lower surface of the rigid body portion main body 234. The annular seal portion 213c is in pressure contact with the inner circumferential edge portion of the lower surface of each of the lid 222 and the rigid body portion main body 234.

In the above configuration, the second main body rubber 230 mainly supports a static load applied to the vibration-damping device 21 and suppresses the axial relative displacement of the outer attachment member 211 and the inner attachment member 212, while the first main body rubbers 213a and 213b are elastically deformed and the liquid in the liquid chamber 214 is made to flow between the first liquid chamber 226 and the second liquid chamber 227 through the restriction passage 221 when the axial vibration is input, so that the vibration can be damped and absorbed. That is, the vibration-damping device 21 has a configuration in which a vibration-damping rubber and a liquid-sealed vibration-damping device are directly coupled to each other in the axial direction.

As described above, according to the vibration-damping device 21 according to the present embodiment, the coupled portion 235 is disposed on any one end surface of both end surfaces of the first mounting projecting portion 224 in the axial direction, the second mounting projecting portion 225 is disposed on the other end surface thereof, and the first end member 217 is not axially sandwiched by the coupled portion 235 and the first mounting projecting portion 224. Thus, it is possible to reduce the number of members to be sandwiched in the axial direction, and it is possible to suppress the generation of abnormal noise when the vibration is input.

Since the plurality of first crimping portions 228 for crimping the first end member 217 are formed not only on the intermediate member 216 but also on the first mounting projecting portion 224, it is possible to crimp the first crimping portion 228 with little bias over the entire circumferential length of the first end member 217, and the first end member 217 can be firmly fixed to the intermediate member 216 without being coupled to the first mounting projecting portion 224 by using the fixing bolt 236.

Since the plurality of first crimping portions 228 are formed on the intermediate member 216 at intervals in the circumferential direction, the first end member 217 can be reliably and firmly fixed to the intermediate member 216.

In the intermediate member 216, the distance between the first crimping portions 228 adjacent to each other in the circumferential direction is larger than the distance between the second crimping portions 229 adjacent to each other in the circumferential direction. Thus, it is possible to apply a crimping force over a wide range in the circumferential direction to the first end member 217 from the plurality of first crimping portions 228, and the first end member 217 can be reliably and firmly fixed to the intermediate member 216.

Since the projecting rib 217d fitted into the attachment hole 235a formed in the coupled portion 235 is formed on the upper end surface of the first end member 217, it is possible to suppress the relative positional deviation between the first end member 217 and the coupled portion 235, and it is possible to suppress a situation in which the first end member 217 and the coupled portion 235 collide against each other and abnormal noise is generated, when the vibration is input.

Since one of the plurality of first crimping portions 228 is formed at the upper end portion of the first mounting projecting portion 224, which is located to project axially outward with respect to the intermediate member 216, the first crimping portion 228 can be easily formed on the first mounting projecting portion 224.

One of the plurality of first crimping portions 228 is formed at the upper end portion of the first mounting projecting portion 224 and is located above the other first crimping portion 228 formed in the intermediate member 216. Thus, it is possible to reliably suppress a situation in which the first end member 217 and the intermediate member 216 are relatively displaced such that the central axes thereof are inclined from each other, and the first end member 217 can be reliably and firmly fixed to the intermediate member 216.

In addition, the technical scope of the present invention is not limited to the above embodiment, and various changes can be made within the scope of the present invention.

For example, in the above embodiment, a configuration in which the lower first main body rubber 213b is in pressure contact with the outer circumferential surface of the inner attachment member 212 in a non-bonded state and the upper first main body rubber 213a is bonded to the outer circumferential surface of the inner attachment member 212 has been shown. However, a configuration in which the upper first main body rubber 213a is in pressure contact with the outer circumferential surface of the inner attachment member 212 in a non-bonded state and the lower first main body rubber 213b is bonded to the outer circumferential surface of the inner attachment member 212 may be adopted.

Additionally, in the above embodiment, a configuration in which the outer surface of the upper first main body rubber 213a extends downward from the inside toward the outside in the radial direction has been shown. However, the outer surface of the upper first main body rubber 213a may extend downward from the outside toward the inside in the radial direction or may extend straight in the radial direction.

Additionally, in the above embodiment, a configuration in which the support metal fitting 223 is buried in the lower first main body rubber 213b has been shown. However, the lid 222 may be sandwiched between the bottom surface of the press-fitting hole 234a and the lower first main body rubber 213b in which the support metal fitting 223 is not buried.

Additionally, in the above embodiment, a configuration in which the lower first main body rubber 213b straddles and is in pressure contact with the lower surface of the lid 222 and the lower surface of the rigid body portion main body 234 has been shown. However, a configuration in which the lower first main body rubber 213b does not abut against both the lower surface of the lid 222 and the lower surface of the rigid body portion main body 234, or a configuration in which the lower first main body rubber 213b abuts on any one of the lower surface of the lid 222 and the lower surface of the rigid body portion main body 234 may be adopted.

Additionally, in the above embodiment, a configuration in which the second main body rubber 230 and the outer plate member 219 are disposed above the pair of first main body rubbers 213a and 213b and the first end member 217 has been shown. However, a configuration in which the second main body rubber 230 and the outer plate member 219 are disposed below the pair of first main body rubbers 213a and 213b and the second end member 218 may be adopted.

Additionally, the second main body rubber 230 may be bonded to the outer circumferential surface of the inner attachment member 212.

Additionally, the present invention can also be applied to a vibration-damping device having no second main body rubber 230 and outer plate member 219.

Additionally, a configuration may be adopted that does not have at least one of the annular top wall 219c, the inner tubular portion 219d, the outer tubular portion 219e, and the receiving plate portion 219f as the inner portion 219a of the outer plate member 219.

The present invention can also be applied to a vibration-damping device that does not have the bound stopper 241, the bound stopper rubber 241a, the rebound stopper 242, and the rebound stopper rubber 242a.

For example, in the above embodiment, the partition member 215 including the elastic portion 232 and the rigid body portion 233 has been shown. However, the present invention is not limited to such an embodiment, and for example, a configuration including only the rigid body portion may be adopted.

Additionally, the restriction passage 221 may extend less than 360° around the central axis O.

Additionally, the orifice groove 233a may be formed on an outer circumferential surface of the rigid body portion main body 234.

The vibration-damping device 21 is not limited to a cabin mount of a vehicle and can be applied to those other than the cabin mount. The vibration-damping device can be applied to, for example, an engine mount or a bush for a vehicle, a mount of a generator mounted on a construction machine or can be applied to a mount of a machine installed in a factory or the like.

In addition, it is possible to appropriately replace the constituent elements in the above-described embodiment with well-known constituent elements within the scope of the present invention as defined in the claims. Additionally, the above-described modification examples may be appropriately combined.

According to the present invention, the coupled portion is disposed on any one of both end surfaces of the first mounting projecting portion in the axial direction, the second mounting projecting portion is disposed on the other end surface thereof, and the first end member is not axially sandwiched by the coupled portion and the first mounting projecting portion. Thus, it is possible to reduce the number of members to be sandwiched in the axial direction, and it is possible to suppress the generation of abnormal noise when the vibration is input.

Since the plurality of first crimping portions for crimping the first end member are formed not only on the intermediate member but also on the first mounting projecting portion, it is possible to crimp the first crimping portion with little bias over the entire circumferential length of the first end member, and the first end member can be firmly fixed to the intermediate member without being coupled to the one end surface of the first mounting projecting portion by using the fixing bolt.

A plurality of the first crimping portions are formed at intervals in the circumferential direction on the intermediate member, a plurality of the second crimping portions for crimping the second end member are formed at intervals in the circumferential direction on the intermediate member, and in the intermediate member, the distance between the first crimping portions adjacent to each other in the circumferential direction may be larger than the distance between the second crimping portions adjacent to each other in the circumferential direction.

In this case, since the plurality of first crimping portions are formed at intervals in the circumferential direction on the intermediate member, the first end member can be reliably and firmly fixed to the intermediate member.

In the intermediate member, the distance between the first crimping portions adjacent to each other in the circumferential direction is larger than the distance between the second crimping portions adjacent to each other in the circumferential direction. Thus, it is possible to apply a crimping force over a wide range in the circumferential direction to the first end member from the plurality of first crimping portions, and the first end member can be reliably and firmly fixed to the intermediate member.

One end surface facing a side opposite to the liquid chamber side in the axial direction out of the both end surfaces of the first end member in the axial direction may be provided with a projecting rib that projects in the axial direction, extends in the circumferential direction, and is fitted into an attachment hole formed in the coupled portion.

In this case, since the projecting rib fitted into the attachment hole formed in the coupled portion is formed on the one end surface of the first end member, it is possible to suppress the relative positional deviation between the first end member and the coupled portion, and it is possible to suppress a situation in which the first end member and the coupled portion collide against each other and abnormal noise is generated, when the vibration is input.

One end portion on a side where the first end member may be located with respect to the second end member in the axial direction out of both end portions of the first mounting projecting portion in the axial direction is located to project axially outward with respect to the intermediate member, one end portion on a side opposite to the liquid chamber side in the axial direction out of both end portions of the first end member in the axial direction may project axially outward from the intermediate member and is radially adjacent to the one end portion of the first mounting projecting portion, and one of the plurality of first crimping portions may be formed at the one end portion of the first mounting projecting portion and crimps the one end portion of the first end member.

In this case, since one of the plurality of first crimping portions is formed at the one end portion of the first mounting projecting portion, which is located to project axially outward with respect to the intermediate member, the first crimping portion can be easily formed on the first mounting projecting portion.

One of the plurality of first crimping portions is formed at the one end portion of the first mounting projecting portion and is located above the other first crimping portion formed in the intermediate member. Thus, it is possible to reliably suppress a situation in which the first end member and the intermediate member are relatively displaced such that the central axes thereof are inclined from each other, and the first end member can be reliably and firmly fixed to the intermediate member.

INDUSTRIAL APPLICABILITY

According to the vibration-damping device according to the present invention, it is possible to suppress the generation of abnormal noise when the vibration is input.

REFERENCE SIGNS LIST 11, 21: Vibration-damping device
111, 211: Outer attachment member
111a, 211a: Insertion hole
112, 212: Inner attachment member
113a, 113b, 213a, 213b: First main body rubber
114, 214: Liquid chamber
115, 215: Partition member
116, 216: Intermediate member
117, 217: First end member
117a, 217a: First flange portion (flange portion)
118, 218: Second end member
121, 221: Restriction passage
124, 224: First mounting projecting portion 125, 225: Second mounting projecting portion
126, 226: First liquid chamber
127, 227: Second liquid chamber
128, 228: First crimping portion
129, 229: Second crimping portion
135, 235: Coupled portion
136, 236: Fixing bolt
O: Central axis

The invention claimed is:

1. A vibration-damping device comprising:
a tubular outer attachment member coupled to any one of a vibration generating part and a vibration receiving part, and an inner attachment member coupled to the other of the vibration generating part and the vibration receiving part and disposed inside the outer attachment member;
a pair of first main body rubbers that couples the outer attachment member and the inner attachment member to each other and is disposed at a distance in an axial direction along a central axis of the outer attachment member; and
a partition member that partitions a liquid chamber between the pair of first main body rubbers into a first liquid chamber and a second liquid chamber in the axial direction and is provided with a restriction passage allowing the first liquid chamber and the second liquid chamber to communicate with each other,
wherein the outer attachment member includes a first end member and a second end member to which the pair of first main body rubbers is respectively coupled, and an intermediate member to which the partition member is coupled,
the intermediate member is formed in a tubular shape extending in the axial direction,
the first end member and the second end member are respectively fitted into both end portions of the intermediate member in the axial direction,
a first mounting projecting portion is provided on an outer circumferential surface of the intermediate member to project radially outward,
a second mounting projecting portion is provided on the second end member to project radially outward,
a coupled portion provided in any one of the vibration generating part and the vibration receiving part is disposed on any one end surface of both end surfaces of the first mounting projecting portion in the axial direction, and the second mounting projecting portion is disposed on the other end surface thereof,
the first mounting projecting portion and the second mounting projecting portion are separately provided with insertion holes through which fixing bolts for integrally fixing the first mounting projecting portion and the second mounting projecting portion and for coupling the first mounting projecting portion to the coupled portion are inserted,
a first crimping portion for crimping the first end member and a second crimping portion for crimping the second end member are separately formed at both end portions of the intermediate member in the axial direction, and
a circumferential length of the first crimping portion is larger than a circumferential length of the second crimping portion.

2. The vibration-damping device according to claim 1, wherein a crimped portion of the first end member in a circumferential direction, which is crimped to the first crimping portion, projects axially outward from the intermediate member.

3. The vibration-damping device according to claim 2, wherein the crimped portion of the first end member is provided with a flange portion that projects radially outward and extends in the circumferential direction.

4. The vibration-damping device according to claim 3, wherein the second mounting projecting portion is formed in a plate shape having a thickness in the axial direction, and a plate thickness of the second mounting projecting portion is larger than a plate thickness of the flange portion.

5. The vibration-damping device according to claim 1, wherein the first crimping portion and the second crimping portion are formed in a portion of the intermediate member that is separated from the insertion holes of the first mounting projecting portion in the circumferential direction.

6. The vibration-damping device according to claim 2, wherein the first crimping portion and the second crimping portion are formed in a portion of the intermediate member that is separated from the insertion holes of the first mounting projecting portion in the circumferential direction.

7. The vibration-damping device according to claim 3, wherein the first crimping portion and the second crimping portion are formed in a portion of the intermediate member that is separated from the insertion holes of the first mounting projecting portion in the circumferential direction.

8. The vibration-damping device according to claim 4, wherein the first crimping portion and the second crimping portion are formed in a portion of the intermediate member that is separated from the insertion holes of the first mounting projecting portion in the circumferential direction.

9. A vibration-damping device comprising:
a tubular outer attachment member coupled to any one of a vibration generating part and a vibration receiving part, and an inner attachment member coupled to the other of the vibration generating part and the vibration receiving part and disposed inside the outer attachment member;
a pair of first main body rubbers that couples the outer attachment member and the inner attachment member to each other and is disposed at a distance in an axial direction along a central axis of the outer attachment member; and
a partition member that partitions a liquid chamber between the pair of first main body rubbers into a first liquid chamber and a second liquid chamber in the axial direction and is provided with a restriction passage allowing the first liquid chamber and the second liquid chamber to communicate with each other,
wherein the outer attachment member includes a first end member and a second end member to which the pair of first main body rubbers is respectively coupled, and an intermediate member to which the partition member is coupled,
the intermediate member is formed in a tubular shape extending in the axial direction,
the first end member and the second end member are respectively fitted into both end portions of the intermediate member in the axial direction,
a first mounting projecting portion is provided on an outer circumferential surface of the intermediate member to project radially outward,
a second mounting projecting portion is provided on the second end member to project radially outward, a coupled portion provided in any one of the vibration generating part and the vibration receiving part is disposed on any one end surface of both end surfaces of the first mounting projecting portion in the axial direction, and the second mounting projecting portion is disposed on the other end surface thereof, the first mounting projecting portion and the second mounting projecting portion are separately provided with insertion holes through which fixing bolts for integrally fixing the first mounting projecting portion and the second mounting projecting portion and for coupling the first mounting projecting portion to the coupled portion are inserted, and first crimping portions for crimping the first end member are separately formed at intervals in the circumferential direction on the intermediate member and the first mounting projecting portion.

10. The vibration-damping device according to claim 9, wherein a plurality of the first crimping portions are formed at intervals in the circumferential direction on the intermediate member, a plurality of second crimping portions for crimping the second end member are formed at intervals in the circumferential direction on the intermediate member, and in the intermediate member, a distance between the first crimping portions adjacent to each other in the circumferential direction is larger than a distance between the second crimping portions adjacent to each other in the circumferential direction.

11. The vibration-damping device according to claim 9, wherein one end surface facing a side opposite to the liquid chamber side in the axial direction out of both end surfaces of the first end member in the axial direction is provided with a projecting rib that projects in the axial direction, extends in the circumferential direction, and is fitted into an attachment hole formed in the coupled portion.

12. The vibration-damping device according to claim 9, wherein one end portion on a side where the first end member is located with respect to the second end member in the axial direction out of both end portions of the first mounting projecting portion in the axial direction is located to project axially outward with respect to the intermediate member, one end portion on a side opposite to the liquid chamber side in the axial direction out of both end portions of the first end member in the axial direction projects axially outward from the intermediate member and is radially adjacent to the one end portion of the first mounting projecting portion, and one of the plurality of first crimping portions is formed at the one end portion of the first mounting projecting portion and crimps the one end portion of the first end member.

13. The vibration-damping device according to claim 10, wherein one end surface facing a side opposite to the liquid chamber side in the axial direction out of both end surfaces of the first end member in the axial direction is provided with a projecting rib that projects in the axial direction, extends in the circumferential direction, and is fitted into an attachment hole formed in the coupled portion.

14. The vibration-damping device according to claim 10, wherein one end portion on a side where the first end member is located with respect to the second end member in the axial direction out of both end portions of the first mounting projecting portion in the axial direction is located to project axially outward with respect to the intermediate member, one end portion on a side opposite to the liquid chamber side in the axial direction out of both end portions of the first end member in the axial direction projects axially outward from the intermediate member and is radially adjacent to the one end portion of the first mounting projecting portion, and one of the plurality of first crimping portions is formed at the one end portion of the first mounting projecting portion and crimps the one end portion of the first end member.

15. The vibration-damping device according to claim 11, wherein one end portion on a side where the first end member is located with respect to the second end member in the axial direction out of both end portions of the first mounting projecting portion in the axial direction is located to project axially outward with respect to the intermediate member, one end portion on a side opposite to the liquid chamber side in the axial direction out of both end portions of the first end member in the axial direction projects axially outward from the intermediate member and is radially adjacent to the one end portion of the first mounting projecting portion, and one of the plurality of first crimping portions is formed at the one end portion of the first mounting projecting portion and crimps the one end portion of the first end member.

16. The vibration-damping device according to claim 13, wherein one end portion on a side where the first end member is located with respect to the second end member in the axial direction out of both end portions of the first mounting projecting portion in the axial direction is located to project axially outward with respect to the intermediate member, one end portion on a side opposite to the liquid chamber side in the axial direction out of both end portions of the first end member in the axial direction projects axially outward from the intermediate member and is radially adjacent to the one end portion of the first mounting projecting portion, and one of the plurality of first crimping portions is formed at the one end portion of the first mounting projecting portion and crimps the one end portion of the first end member.

* * * * *